(12) United States Patent
Beckers et al.

(10) Patent No.: US 10,900,912 B2
(45) Date of Patent: Jan. 26, 2021

(54) X-RAY ANALYSIS APPARATUS

(71) Applicant: Malvern Panalytical B.V., Almelo (NL)

(72) Inventors: Detlef Beckers, Almelo (NL); Milen Gateshki, Almelo (NL); Jaap Boksem, Almelo (NL); Fabio Masiello, Almelo (NL)

(73) Assignee: MALVERN PANALYTICAL B.V., Almelo (NL)

( * ) Notice: Subject to any disclaimer, the term of this patent is extended or adjusted under 35 U.S.C. 154(b) by 0 days.

(21) Appl. No.: 16/384,199

(22) Filed: Apr. 15, 2019

(65) Prior Publication Data
US 2019/0317029 A1 Oct. 17, 2019

(30) Foreign Application Priority Data

Apr. 13, 2018 (EP) .................................... 18167396
Apr. 4, 2019 (EP) .................................... 19167427

(51) Int. Cl.
*G01N 23/20008* (2018.01)
*G01N 23/207* (2018.01)
(Continued)

(52) U.S. Cl.
CPC ..... *G01N 23/20008* (2013.01); *G01N 23/207* (2013.01); *G01N 23/201* (2013.01); *G01N 23/20016* (2013.01); *G01N 2223/316* (2013.01)

(58) Field of Classification Search
CPC ....... G01N 2223/076; G01N 2223/316; G01N 23/20008; G01N 23/20016; G01N 23/201; G01N 23/207
See application file for complete search history.

(56) References Cited

U.S. PATENT DOCUMENTS 6,292,532 B1 9/2001 Kawahara et al.
6,546,069 B1 4/2003 Martin
(Continued)

FOREIGN PATENT DOCUMENTS

DE 92 12 265 3/1993

*Primary Examiner* — Chih-Cheng Kao
(74) *Attorney, Agent, or Firm* — Leason Ellis LLP

(57) ABSTRACT

The X-ray analysis apparatus of the present invention comprises a sample stage for supporting a sample, a goniometer having an axis of rotation, and an X-ray detector arranged to be rotatable about the axis of rotation of the goniometer, wherein the X-ray detector is arranged to receive X-rays from the sample directed along an X-ray beam path. The X-ray analysis apparatus further comprises a first collimator, a second collimator and a third collimator each having a first configuration and a second configuration. In its first configuration, the collimator is arranged in the X-ray beam path. In its second configuration the collimator is arranged outside of the X-ray beam path. A first actuator arrangement is configured to move the first collimator and the second collimator between the first configuration and the second configuration by moving the first collimator and the second collimator in a lateral direction that intersects the X-ray beam path. A second actuator arrangement is configured to move the third collimator between its first configuration and its second configuration. A controller is configured to control the first actuator arrangement to move the first collimator between the first configuration and the second configuration.

15 Claims, 11 Drawing Sheets

(51) Int. Cl.
*G01N 23/20016* (2018.01)
*G01N 23/201* (2018.01)

(56) References Cited

U.S. PATENT DOCUMENTS

2007/0086567 A1* 4/2007 Kataoka ............. G01N 23/2209
378/45
2012/0294418 A1 11/2012 Yellepeddi et al.

* cited by examiner

X-RAY ANALYSIS APPARATUS

CROSS-REFERENCE TO RELATED PATENT APPLICATIONS

The present application claims priority under 35 U.S.C. § 119 to European Patent Application No. 18167396.3, filed Apr. 13, 2018 and European Patent Application No. 19167427.4, filed Apr. 4, 2019, all of which are hereby incorporated by reference, as if expressly set forth in their respective entireties herein.

FIELD OF THE INVENTION

This invention relates to an X-ray analysis apparatus and a method for using an X-ray analysis apparatus. More particularly, the present invention relates to an X-ray analysis apparatus for use in multiple applications.

BACKGROUND OF THE INVENTION

X-ray analysis is a method for characterising material samples. Some X-ray analysis methods are X-ray diffraction methods, for example the Bragg Brentano method, Grazing Incidence X-ray Diffraction (GIXRD) and X-ray microdiffraction. Other X-ray analysis methods include Small Angle X-ray Scattering (SAXS), Grazing Incidence Small Angle X-ray Scattering (GISAXS), and X-ray Reflectometry.

In general, an X-ray measurement is carried out by directing X-rays from an X-ray source onto a sample along an incident X-ray beam path. X-rays are scattered or diffracted by the sample. An X-ray detector detects at least some of the scattered or diffracted X-rays.

X-rays optics such as divergence slits, anti-scatter slits and collimators may be provided on the incident and/or diffracted/scattered beam side.

In addition, X-ray measurements are often carried out on a batch of samples. Different samples in the batch may have different properties (in terms of material, shape and/or size). Accordingly, the optimal X-ray analysis apparatus may vary between samples.

Generally, in order to use an X-ray analysis apparatus for carrying out different measurements using different X-ray analysis methods, users must reconfigure the X-ray analysis apparatus. This requires expertise. Further, reconfiguring the X-ray equipment is both inconvenient and time consuming.

It would be desirable to provide an X-ray analysis apparatus that is capable of delivering high quality measurements for multiple different applications.

SUMMARY OF THE INVENTION

According to an aspect of the invention there is provided an X-ray analysis apparatus comprising:
a sample stage for supporting a sample;
a goniometer having an axis of rotation;
an X-ray detector arranged to be rotatable about the axis of rotation of the goniometer, wherein the X-ray detector is arranged to receive X-rays from the sample directed along an X-ray beam path;
a first collimator, a second collimator and a third collimator wherein each of the first, second and third collimators has:
a first configuration, in which the collimator is arranged in the X-ray beam path, and
a second configuration in which the collimator is arranged outside of the X-ray beam path;
a first actuator arrangement configured to move the first collimator between the first configuration and the second configuration by moving the first collimator in a lateral direction that intersects the X-ray beam path, and to move the second collimator between the first configuration and the second configuration by moving the second collimator in a lateral direction that intersects the X-ray beam path;
a second actuator arrangement arranged to move the third collimator between the first configuration and the second configuration by moving the third collimator in a lateral direction that intersects the X-ray beam path; and
a controller configured to:
control the first actuator arrangement to move the first collimator between the first configuration and the second configuration and to move the second collimator between the first configuration and the second configuration; and
control the second actuator arrangement to move the third collimator between the first configuration and the second configuration, wherein each of the first collimator, the second collimator and the third collimator is either a Soller slit collimator or a parallel plate collimator.

In general, during an X-ray analysis measurement, an incident X-ray beam from an X-ray source irradiates the sample. The X-ray detector has a detection region for receiving X-rays from the sample. The X-ray detector is arranged to detect X-rays from the sample, directed towards the detection region of the detector. That is, the X-ray detector is arranged to detect X-rays directed along the X-ray beam path.

For example, in an X-ray diffraction measurement, X-rays are diffracted by the sample and travel along a diffracted X-ray beam path towards the detector, which is arranged to receive the diffracted X-ray beam. In other types of X-ray analysis measurement, X-rays are scattered or reflected by the sample. The detector is arranged to receive X-rays scattered along a scattered X-ray beam path.

The first, second and third collimators are arranged between the sample and the detector.

When the first collimator is in its first configuration, it is arranged in the X-ray beam path. That is, in use, in the first configuration the first collimator is positioned in the X-ray beam.

When the first collimator is in the second configuration, it is arranged outside of the X-ray beam path. That is, in use, when the first collimator is in the second configuration the X-ray beam strikes the detection region without passing through the first collimator.

Accordingly, by controlling the first actuator arrangement to move the first collimator between the first and second configuration it is possible to control whether or not the X-rays directed along the X-ray beam path pass through the first collimator. This provides users with a more flexible arrangement, since the apparatus can be used both with the first collimator and without the first collimator in the X-ray beam. In addition, this arrangement can avoid the need for time-consuming alignment of the first collimator, by an expert operator.

In general, collimators are X-ray optics for limiting the divergence of an X-ray beam. A one-dimensional collimator is structured so as to limit the divergence of the X-ray beam in only one direction. A two-dimensional collimator is structured to limit the divergence of the beam in two directions.

The first actuator arrangement may be configured to move the first collimator between the first configuration and the second configuration by moving the first collimator in a direction substantially parallel to the axis of rotation.

The inventors have realised that providing an arrangement in which the first collimator is arranged to move in a substantially axial direction can help to avoid limiting or interfering with the angular range of the goniometer.

The axial direction is a direction parallel to the axis of rotation of the goniometer. The first actuator arrangement is configured to move the first collimator between the first configuration and the second configuration by moving the first collimator in a direction substantially parallel to the axial direction. For example, the angle between the direction in which the first collimator is moved by the first actuator and the axis about which the detector is arranged to rotate is less than ten degrees, and preferably less than five degrees. Preferably the first collimator is arranged to move in a direction parallel to the axial direction.

Because the first collimator or the second collimator can be arranged in the X-ray beam path, the X-ray analysis apparatus provides a more flexible arrangement since it is possible to choose whether a collimator is arranged in the X-ray beam path and which one of the two collimators is provided in the X-ray beam path. Furthermore, it is possible to exchange the first collimator for the second collimator without carrying out time-consuming realignment of the X-ray analysis apparatus, by an expert operator.

In some embodiments, the first actuator arrangement includes a single actuator configured to move both the first collimator and the second collimator. In some other embodiments the first actuator arrangement comprises a first actuator configured to move the first collimator and a second actuator configured to move the second collimator.

Preferably, the first actuator arrangement is configured to move the first collimator and the second collimator in a direction substantially parallel to the axis of rotation. For example, the angle between the direction in which the first collimator and the second collimator are moved by the first actuator arrangement and the axis about which the detector is arranged to rotate is less than ten degrees, and preferably less than five degrees.

In an embodiment, the first collimator and the second collimator are both Soller slit collimators for limiting the axial divergence of the X-ray beam and the third collimator is a parallel plate collimator for limiting the equatorial divergence of the X-ray beam.

An angular divergence of the first collimator may be smaller than an angular divergence of the second collimator.

In some embodiments, the first collimator and the second collimator are both parallel plate collimators for limiting the equatorial divergence of the X-ray beam, and the third collimator is a Soller slit collimator for limiting the axial divergence of the X-ray beam. An angular divergence of the first collimator may be smaller than an angular divergence of the second collimator.

Both of these types of collimator (Soller slit collimator and parallel plate collimator) comprise a series of parallel plates, which are spaced apart from one another in a stacked arrangement. The spacing between the plates together with the size of the plates determines the angular divergence of the collimator. The angular divergence of the collimator indicates the maximum angular divergence of the X-rays allowed to pass through the collimator. When the collimator is arranged in an X-ray beam, it allows X-rays having an angular divergence equal to or less than the angular divergence of the collimator to pass through it, and prevents X-rays having an angular divergence greater than the angular divergence of the collimator from passing through it.

In an embodiment, the first collimator is rigidly coupled to the second collimator.

By rigidly fixing the first collimator and the second collimator to one another, the position of the two collimators relative to one another is fixed. Therefore, a single actuator can act to move the first collimator and the second collimator together. Accordingly, the first and second collimators can be repositioned at the same time, in a single movement.

In some embodiments, the first actuator arrangement may act on the rigidly coupled collimators to change the collimator configuration.

In some embodiments, the X-ray analysis apparatus comprises a first support component configured to support the first collimator and the second collimator.

The X-ray analysis apparatus may further comprising a first support component that is rigidly coupled to the X-ray detector and preferably a second support component that is rigidly coupled to the X-ray detector.

Preferably, the first support component is fixed to the detector to maintain alignment of the first support component with the detector. In this way, even when the position of the detector is changed, and/or the configuration of the collimator(s) is/are changed, it is not necessary for an expert user to realign the apparatus. In this embodiment, to change the configuration of any of the collimators, the first actuator arrangement and/or the second actuator arrangement move the collimators relative to the support component(s).

The first collimator and the second collimator may be fixed to the first support component and the first actuator arrangement may be arranged to move the first support component, thereby moving the first and second collimator, to change the configuration of both collimators.

The first actuator arrangement may comprise a linear actuator arranged to change the configuration of the first collimator.

The linear actuator is arranged to act on the first collimator to move the first collimator between the first configuration and the second configuration of the first collimator.

Preferably, the linear actuator is arranged to move the second collimator to change the configuration of the second collimator.

Preferably, the linear actuator comprises a mechanical actuator, such as a worm drive.

The third collimator may be arranged between the first collimator and the sample. That is, the third collimator may be arranged to be closer to the sample along the axis of the direction of travel of the X-ray than the first collimator. By providing the third collimator, it is possible to provide a combination of the first collimator or the second collimator with the third collimator in the X-ray beam path. It is also possible to provide the third collimator in the X-ray beam path without the first collimator or the second collimator.

Alternatively, the third collimator may be arranged between the first collimator and the detector. That is, the first collimator may be arranged to be closer to the sample along the axis of the direction of travel of the X-rays from the sample than the third collimator.

Preferably, the second actuator arrangement is configured to move the third collimator in a direction substantially parallel to the axis of rotation.

The second actuator arrangement may comprise a single actuator that is configured to move both the third collimator and the fourth collimator at the same time. Alternatively, the second actuator arrangement may comprise multiple actuators. For example, the second actuator arrangement may comprise a third actuator arranged to move the third collimator and a fourth actuator arranged to move the fourth collimator.

The X-ray analysis apparatus may further comprise a fourth collimator arranged between the first collimator and the sample, the fourth collimator having a first configuration in which the fourth collimator is arranged in the X-ray beam path and a second configuration in which the fourth collimator is arranged outside of the X-ray beam path, wherein the second actuator arrangement is configured to move the fourth collimator between the first configuration and the second configuration by moving the fourth collimator in the lateral direction that intersects the X-ray beam path; and the controller is configured to control the second actuator arrangement to move the fourth collimator between the first configuration and the second configuration.

By providing the fourth collimator, it is possible to provide a combination of the first collimator or the second collimator with the fourth collimator in the X-ray beam path.

Preferably, the second actuator arrangement is configured to move the fourth collimator in a direction substantially parallel to the axis of rotation.

The fourth collimator is arranged between the sample and the detector.

In an embodiment the first collimator and the second collimator are Soller slit collimators and the angular divergence of the first collimator is smaller than the angular divergence of the second collimator; and the third collimator and the fourth collimator are parallel plate collimators, wherein the angular divergence of the third collimator is smaller than the angular divergence of the fourth collimator.

In this embodiment, the parallel plate collimators are arranged nearer to the sample and the Soller slit collimators are arranged nearer to the X-ray detector.

In an alternative embodiment, the first collimator and the second collimator are parallel plate collimators and the angular divergence of the first collimator is smaller than the angular divergence of the second collimator; and the third collimator and the fourth collimator are Soller slit collimators, wherein the angular divergence of the third collimator is smaller than the angular divergence of the fourth collimator.

In this embodiment, the Soller slit collimators are arranged nearer to the sample and the parallel plate collimators are arranged nearer to the X-ray detector.

The X-ray analysis apparatus may further comprise:

an X-ray source configured to generate X-rays, wherein the X-ray source and the sample stage are arranged so that X-rays generated by the X-ray source define an incident X-ray beam that irradiates the sample, wherein the incident X-ray beam is directed from the X-ray source to the sample along an incident X-ray beam path;

a first beam mask component arranged between the X-ray source and the sample stage, in the incident X-ray beam path, wherein the first beam mask component comprises a body, a first opening for limiting the size of the incident X-ray beam, and a second opening;

wherein the first beam mask component has a first beam mask component configuration and a second beam mask component configuration, and in the first beam mask component configuration:

the first opening is arranged in the incident X-ray beam path so as to limit the size of the incident X-ray beam and the second opening is arranged outside of the incident X-ray beam path, and in the second beam mask component configuration:

the second opening is arranged in the incident X-ray beam path, and the body and the first opening are arranged outside of the incident X-ray beam path; and wherein the controller is configured to control a first beam mask component actuator to change the configuration of the first beam mask component between the first beam mask component configuration and the second beam mask component configuration by moving the first beam mask component in a plane intersected by the incident X-ray beam; and preferably, the X-ray analysis apparatus further comprises:

a second beam mask component arranged between the first beam mask component and the sample, the second beam mask component comprising a body, a third opening for limiting the size of the incident X-ray beam and a fourth opening;

the second beam mask component having a third beam mask component configuration and a fourth beam mask component configuration, wherein in the third beam mask component configuration:

the third opening is arranged in the incident X-ray beam path and the fourth opening is arranged outside of the incident X-ray beam path, and in the fourth beam mask component configuration:

the fourth opening is arranged in the incident X-ray beam path, and the body and the third opening are arranged outside of the incident X-ray beam path; and wherein the controller is configured to control a second beam mask component actuator to change the configuration of the second beam mask component between the third beam mask component configuration and the fourth beam mask component configuration by moving the second beam mask component in a plane intersected by the incident X-ray beam.

By providing the first beam mask component in the path of the incident X-ray beam, it is possible to either allow the incident X-ray beam to pass through the first beam mask component without the first beam mask selecting a part of the incident X-ray beam (by providing the second opening in the incident X-ray beam path) or to select part of the incident X-ray beam (by providing the first opening in the incident X-ray beam path).

The X-ray analysis apparatus preferably comprises a beam-conditioning unit arranged between the X-ray source and the sample stage, the beam conditioning unit comprising: a graded multi-layer for directing X-rays from the source towards the sample stage, and a Soller slit collimator arranged on the graded multi-layer to limit the axial divergence of the incident X-ray beam.

Preferably, the graded multi-layer is a flat graded multi-layer since using a flat graded multi-layer allows for good results across a large range of X-ray analysis applications.

According to an aspect of the invention, there is provided a method for controlling the X-ray analysis apparatus described above, comprising:

in a first configuration selection step, selecting a collimator configuration:

in a subsequent step, controlling the first actuator arrangement to move the first collimator to the selected collimator configuration;

in a further subsequent step, carrying out an X-ray analysis measurement on the sample; and in a second configuration selection step, changing the collimator configuration during the X-ray analysis measurement of the sample, based on the angular position (2θ) of the detector relative to the incident beam (θ).

The method may include controlling the first actuator arrangement to move the second collimator to the selected collimator configuration.

The method may include controlling the second actuator arrangement to move the third and optionally fourth collimator to a selected collimator configuration.

In an X-ray diffraction measurement, the detector is arranged to detect X-rays diffracted by a sample. The controller is configured to change the collimator configuration, by controlling the first and/or second actuator arrangement.

The X-ray analysis measurement may comprise a series of measurements at different angles. The detector and X-ray source/sample may be moved to a series of different 2θ positions. Intensity may be recorded at some of the 2θ positions with the collimators in one collimator configuration, then at other 2θ positions in a different collimator configuration.

In an embodiment, the user selects a mode before carrying out an X-ray analysis measurement. For example, the mode relates to a measurement type (e.g. Bragg Brentano, GIXRD, SAXS, GISAXS) or a sample type. In this embodiment, the controller is configured to receive information identifying a measurement mode. In response to this information, the controller determines which collimator configuration is associated with the measurement mode. The controller can be pre-configured with a specific collimator configuration for each particular mode and, in response to the user selecting a mode, the controller determines which collimator configuration is associated with the selected mode.

In another embodiment, the controller selects the collimator configuration automatically, based on initial X-ray measurement data.

The step of selecting a collimator configuration may comprise selecting a configuration of the first collimator, the second collimator, the third collimator and/or the fourth collimator.

By positioning the first collimator in the X-ray beam path from the sample to the detector, the divergence of the scattered/diffracted X-ray beam is limited. This can deliver improved peak resolution. However, positioning the first collimator in the X-ray beam path can also reduce the intensity of the X-ray beam detected at the detector. For example, in an X-ray diffraction measurement, the detected peaks are more symmetric at angles above 40 degrees, and the intensity of the peaks is lower. By providing a controller that is configured to control the configuration of the first collimator based on the angular position of the detector, it is possible to optimise intensity and peak resolution for different measurement angles. The controller may be pre-configured to change the collimator configuration at a predetermined angle.

The method may further comprise:
in an initial measurement step, carrying out an initial X-ray measurement before the first configuration selection step by detecting X-rays at respective angular positions of the detector to obtain one or more measurement peaks;
in an initial analysis step, analysing the result of the initial X-ray measurement, preferably by comparing at least one parameter of the one or more measurement peaks to a threshold value, to obtain an analysis of the initial X-ray measurement; and
in the first configuration selection step, selecting the collimator configuration based on the analysis of the initial X-ray measurement.

The parameter can be a parameter of a single peak, or a parameter of multiple peaks (for example, an average). In this method, an initial X-ray measurement is carried out. The results of the initial measurement are analysed to assess the quality of the results, preferably by comparing the parameter of the one or more peaks to a threshold value. Based on this comparison, the controller determines which collimator configuration should be used for the X-ray measurement.

The at least one parameter may be an intensity of one or more of the peaks, the threshold value is an intensity threshold value and the controller is configured to control the first actuator arrangement to:
move the first collimator to the first configuration if the intensity of one or more of the peaks is above the intensity threshold value, or
move the first collimator to the second configuration if the intensity of one or more of the peaks is below the intensity threshold value.

The initial measurement may be carried out with both the first collimator in its second configuration and the second collimator in its second configuration.

Alternatively, the initial measurement may be carried out with the second collimator (which has a larger divergence than the first collimator) in its first configuration and the first collimator in its second configuration. If the intensity of one or more of the peaks is above the intensity threshold value, the controller can move the first collimator to its first configuration and move the second collimator to its second configuration. If the intensity of one or more of the peaks is below the intensity threshold value, the controller can move the second collimator to its second configuration. In this case, the first collimator remains in its second configuration. That is, the controller controls the first actuator arrangement so that the first collimator is in the second configuration.

The initial measurement may be carried out with the first collimator (which has a smaller divergence than the second collimator) in its first configuration and the second collimator in its second configuration. If the intensity of one or more of the peaks is below the intensity threshold value, the controller can move the first collimator to its second configuration and optionally move the second collimator to its first configuration. The parameter can be the maximum intensity of a single peak or the averaged maximum intensities of multiple peaks.

By comparing the maximum intensity of a peak or the average maximum intensity of multiple peaks to an intensity threshold value it is possible to determine whether the collimator configuration used during the initial measurement delivers acceptable intensity.

Preferably, the method comprises moving the first collimator to its first configuration if the parameter is above the intensity threshold value and moving the first collimator to its second configuration if the parameter is below the intensity threshold value.

More preferably, the method comprises moving the first collimator to its first configuration and moving the second collimator to its second configuration if the parameter is above the intensity threshold value and moving the first collimator to its second configuration and moving the second collimator to its first configuration if the parameter is below the intensity threshold value. In this case, the first collimator has a smaller divergence than the second collimator. Therefore, if measured intensity is below the intensity threshold value, the second collimator can be used to achieve an optimal balance between resolution and intensity.

The method may further comprise comparing the Full Width at Half Maximum of one or more of the peaks to a width threshold value or comparing the peak asymmetry of one or more peaks to a peak asymmetry threshold value.

The controller may be configured to control the first actuator arrangement to move the second collimator from its first configuration to its second configuration if the Full Width at Half Maximum of one or more peaks is above the width threshold value (i.e. resolution in this configuration is not adequate). In this example, the second collimator has a larger divergence than the first collimator. An initial measurement is carried out with the second collimator in its first configuration. If the resolution obtained in this configuration is not adequate, the second collimator is moved to its second configuration and the first collimator is moved to its first configuration.

This can be carried out in the same way with the peak asymmetry parameter. If the measured peak asymmetry of one or more peaks is above the threshold value (i.e. resolution is not adequate), the collimator configuration is changed to provide more collimation.

In some other embodiments, an initial measurement is carried out with the first collimator in its first configuration. If the Full Width at Half Maximum of one or more peaks is below the width threshold value, the first collimator is exchanged with the second collimator.

The initial measurement may be carried out with both collimators in the second configuration. The controller may be configured to control the first actuator arrangement to move the first collimator to the first configuration if the Full Width at Half Maximum of one or more of the peaks is above the width threshold value, and move the first collimator to the second configuration if the Full Width at Half Maximum of one or more of the peaks is below the width threshold value and optionally move the second collimator to the first configuration if the Full Width at Half Maximum of one or more of the peaks is below the width threshold value.

Again, these methods can be carried out in the same way using the peak asymmetry parameter.

The parameter can comprise the Full Width at Half Maximum of a peak or the average Full Width at Half Maximum of multiple peaks.

At higher angles of 2θ, peaks are typically broader and more symmetric around 90 degrees. By comparing the parameter to a threshold value, it is possible to determine whether the collimator configuration used during the initial measurement delivers peaks with sufficiently high resolution.

For example, if the initial measurement is carried out with the second collimator arranged in its first configuration, and the width of the peak is greater than the threshold value, the resolution provided by the X-ray analysis apparatus is not high enough. Better resolution is required, so the controller controls the first actuator arrangement to arrange the first collimator in its first configuration.

The initial analysis step may further comprise determining an angular range based on the analysis of the initial X-ray measurement, and controlling the first actuator arrangement to move the first collimator to the first configuration when the angular position of the X-ray detector is within the angular range, and controlling the first actuator arrangement to move the first collimator to the second configuration when the angular position of the detector is outside of the angular range.

Depending on the type of sample and the measurement type, at high angles of 2θ (for example, 40 degrees), it is preferable to avoid reducing intensity. For example, the first angular range is angles from 0 degrees to 40 degrees and the second angular range is angles above 40 degrees.

In some embodiments, the method further comprises controlling the first actuator arrangement to move the first collimator to the first configuration when the angular position of the detector is below an angular threshold value (or within the first angular range); and controlling the first actuator arrangement to move the first collimator to the second configuration when the angular position of the detector is above the angular threshold value (within the second angular range).

As the angle 2θ increases, the intensity of the measurement peaks becomes unacceptably low. At some angle, it becomes optimal to use a collimator having a greater angular divergence. That is, to use the second collimator instead of the first collimator. This angle is the angular threshold value. By comparing the parameter of one or more peaks to the threshold value, it is possible to identify this angular threshold value.

Optionally, the controller compares multiple measurement peaks to the threshold value. Each peak has a corresponding angular position, so that by determining which measurements peaks have a parameter above the threshold value and which measurement peaks have a parameter below the threshold value, it is possible to determine an angular range or an angular threshold value.

For example, at angles of 2θ below the angular threshold, the peaks have high intensity and are usually narrower so that it is more appropriate to arrange the first collimator in its first configuration and the second collimator in its second configuration. At angles above the angular threshold value, the peaks have low intensity, so that it is more appropriate to arrange the first collimator in its second configuration and the second collimator in its first configuration.

By determining an angular threshold value, the controller can change the collimator configuration during an X-ray measurement of a sample, to optimise the quality of the results.

The controller may be adapted to carry out any of the above-mentioned method steps.

Any of the above-mentioned methods may further comprise the step of correcting the intensity of the X-ray measurements based on the configuration of the first collimator, the second collimator, the third collimator and/or the fourth collimator.

A computer program comprising computer program code configured to cause a controller of an X-ray analysis apparatus to carry out all the steps of the method according to any one of the methods described above when said computer program is run on said controller.

The computer program of claim may be embodied on a non-transitory computer-readable medium.

BRIEF DESCRIPTION OF THE DRAWINGS

The invention will now be described by way of example with reference to the accompanying drawings, in which.

Figure 1:
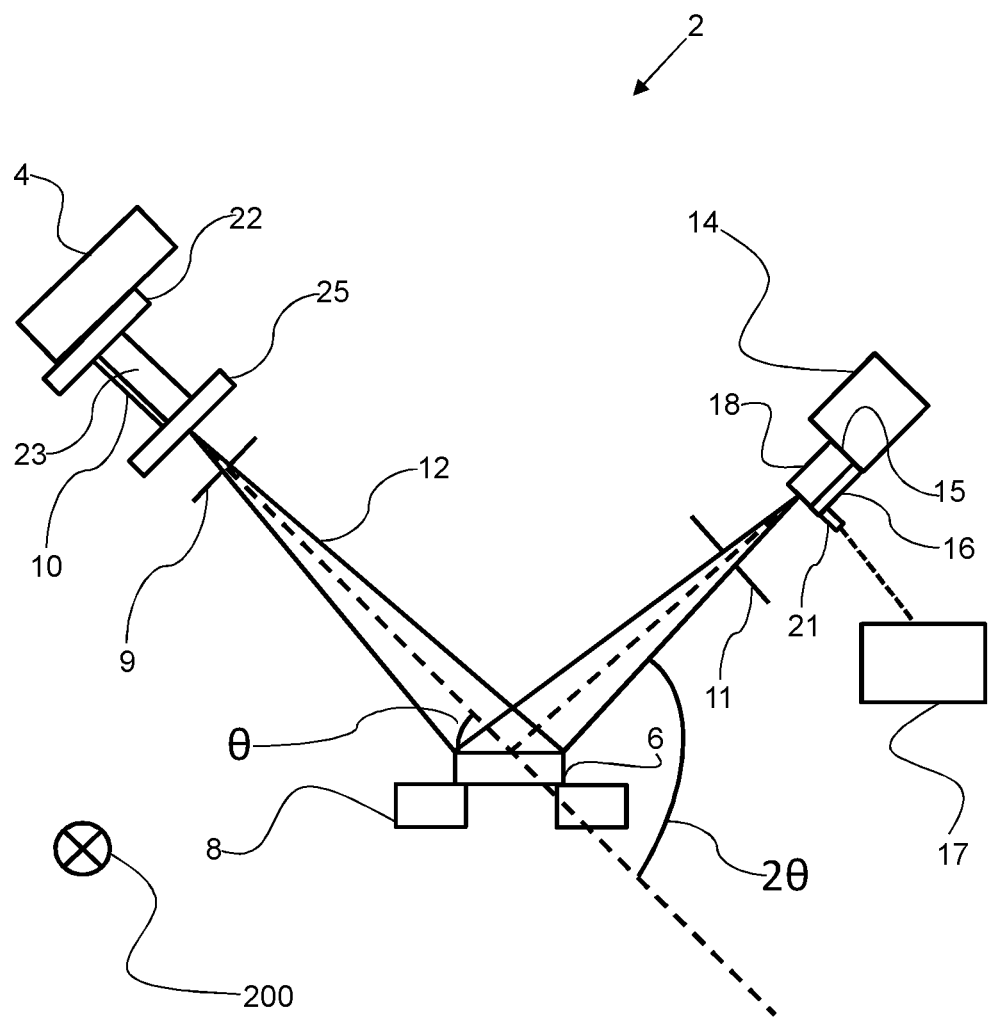
FIG. 1 is a schematic diagram of an X-ray analysis apparatus, in a cross sectional side view, wherein the first collimator is in the first configuration.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Referring to FIG. 1, the X-ray analysis apparatus 2 is arranged for making an X-ray diffraction measurement. The X-ray analysis apparatus 2 includes an X-ray source (X-ray tube 4) configured to generate X-rays and a sample stage 8 for supporting a sample 6. The X-ray tube 4 and the sample stage 8 are configured so that X-rays generated by the X-ray tube 4 define an incident X-ray beam 12 that irradiates the sample 6. The X-ray tube 4 has a line focus. The line focus extends into (is perpendicular to) the plane of the page.

The X-ray tube 4 is arranged to direct X-rays towards the sample 6 at an incident angle, θ. The incident X-rays are diffracted by the sample 6. An X-ray detector 14 is arranged to receive X-rays from the sample 6 that have been diffracted at an angle 2θ to the incident X-rays. The X-ray detector 14 and the X-ray tube 4 are mounted to a goniometer (not shown). The angle (θ) of the incident X-ray beam relative to the surface of the sample, is changed by changing the orientation of the X-ray tube 4 or the sample 6.

The X-ray detector 14 has a detection region 15 for receiving X-rays from the sample 6. The X-ray detector 14 can be operated in a 2D mode, a 1D mode or a 0D mode, by selecting how the active area of the detector is read out. For Bragg Brentano measurements, the 1D or 0D mode can be used.

A first collimator 18 is arranged between the sample stage 8 and the X-ray detector 14. The first collimator is mounted to a first support component 16 for holding at least one collimator. A second collimator 20 (see FIG. 2, FIG. 3) is also mounted to the first support component 16, and is arranged next to the first collimator 18. The first collimator and the second collimator are Soller slit collimators for limiting the axial divergence of the X-ray beam. In FIG. 1, the first collimator is arranged in a first configuration so that the first collimator 18 is arranged in the diffracted X-ray beam path. The second collimator 20 is arranged in a second configuration. That is, the second collimator 20 is arranged outside of the diffracted X-ray beam path. By moving the first collimator and the second collimator, it is possible to change the configuration of each of the collimators. For example, it is possible to replace the first collimator 18 (which is arranged the diffracted X-ray beam) with the second collimator 20. The first collimator 18 and the second collimator 20 are rigidly fixed to each other via the first support component 16. The first actuator arrangement 21 acts on the first support component 16 to move the first collimator 18 and the second collimator 20 together. At any given configuration, at most one of the first collimator 18 and the second collimator 20 can be arranged between the sample 6 and the X-ray detector 14, in the diffracted X-ray beam path, so as to receive X-rays diffracted by the sample at an angle, 2θ.

The X-ray analysis apparatus 2 further comprises a controller 17, for controlling the configuration of the first collimator 18 and the second collimator 20. The controller 17 is in communication with the first actuator arrangement 21 (as illustrated by the dashed line between the first actuator arrangement 21 and the controller 17). The first actuator arrangement 21 is arranged to change the configuration of each collimator by moving the first collimator 18 and the second collimator 20. The first actuator arrangement 21 comprises a single actuator. Because the first collimator 18 and the second collimator 20 are rigidly fixed to one another the first actuator arrangement 21 can move both collimators at the same time.

In the first configuration, the first collimator 18 is arranged between sample stage 8 and the X-ray detector 14 so as to receive X-rays diffracted by the sample 6. The first collimator 18 is aligned with the detection region 15 of the X-ray detector 14 so that X-rays within the divergence angle of the first collimator 18 pass through the first collimator 18 and are detected by the X-ray detector 14. The second collimator 20 is in the second configuration. That is, the second collimator 20 is arranged outside of the diffracted X-ray beam path. The first collimator 18 and the second collimator 20 are arranged to move laterally (that is, the collimators are arranged to move in a sideways direction across the X-ray beam). The X-ray detector 14 is rotated about the axis of rotation of the goniometer (which is parallel to axis 200) to move between different angles of 2θ.

The first actuator arrangement 21 is arranged to cause the first collimator 18 and the second collimator 20 to move relative to the X-ray detector 14, in an axial direction. In this embodiment, the first actuator arrangement 21 is a linear actuator arrangement comprising a worm drive, which is arranged to cause the first collimator 18 and the second collimator 20 to move linearly, along the axial direction. The worm drive (or screw drive) comprises a threaded rod, with a threaded nut or other toothed follower threaded onto the rod. The rod is rotatable about its longitudinal axis. The nut/follower is attached to the first support component 16 and is prevented from rotating with the rod. Thus, when the rod rotates, the nut/follower translates along the rod, moving the first support component.

The first collimator 18 allows beams having an angular divergence within a first range of angles (for example, less than 0.03 radians) to pass through it. The second collimator 20 has an angular divergence that is larger than the first collimator 18 (for example, between 0.03 radians and 0.1 radians), and accordingly allows beams with larger divergence to pass through it.

The inventors have realised that by providing an arrangement in which the controller 17 can change the configuration of the first and second collimator, so that each collimator can be moved between its first configuration and its second configuration in response to a control signal, it is possible to reconfigure the X-ray analysis apparatus in a convenient way. By changing the configuration of the collimators, it is possible to replace the collimator arranged in the diffracted X-ray beam path with the other collimator.

For example, at the start of an X-ray analysis measurement the first collimator 18 is provided in the first configuration and the second collimator 20 is provided in the second configuration. Accordingly, the first collimator 18 is arranged to receive X-rays diffracted by the sample at an angle 2θ. The first collimator 18 can be exchanged for the second collimator 20 by moving the first collimator 18 to its second configuration and moving the second collimator to its first configuration. The first actuator arrangement 21 moves the first collimator 18 and the second collimator, in response to a control signal from the controller 17.

By providing an arrangement in which the first collimator 18 and the second collimator 20 are arranged to move axially, it is also possible to change the collimator configuration without limiting the angular range, 2θ, of the detector 14. At the same time, by providing an arrangement in which the first and second collimators are arranged to move relative to the X-ray detector 14, across the beam path in an axial direction, a compact arrangement is provided.

A programmable anti-scatter slit 11 is arranged between the sample 6 and the detector 14. The anti-scatter slit 11 is arranged to reduce the amount of parasitic scatter from the sample stage that reaches the detector, and is also arranged to reduce the amount of other background scatter that can reach the X-ray detector 14.

Turning to the incident beam side of the X-ray analysis apparatus 2, a first beam mask component 22 is arranged between the X-ray tube 4 and the sample 6. A beam-conditioning unit 23 and a second beam mask component 25 are provided after the first beam mask component 22, in a direction from the X-ray tube 4 towards the sample 6. The beam-conditioning unit 23 is configured to be moveable relative to the X-ray tube 4, so that it can be moved in and out of the incident X-ray beam. The controller 17 is configured to control the position (i.e. configuration) of the beam-conditioning unit. The beam-conditioning unit 23 comprises a graded multilayer 10 (for example, a flat graded multi-layer) and a Soller slit collimator (not shown) fixed to the graded multilayer 10. Using a flat graded multi-layer can be advantageous for several applications, such as small angle X-ray measurements.

A programmable divergence slit 9 is arranged in the incident beam, between the beam conditioning unit 23 and the sample 6. The controller 17 is configured to control the size of the opening of the programmable divergence slit and the programmable anti-scatter slit 11. In this way, the size of the slits can be altered depending on the type of measurement being conducted.

Figure 2:
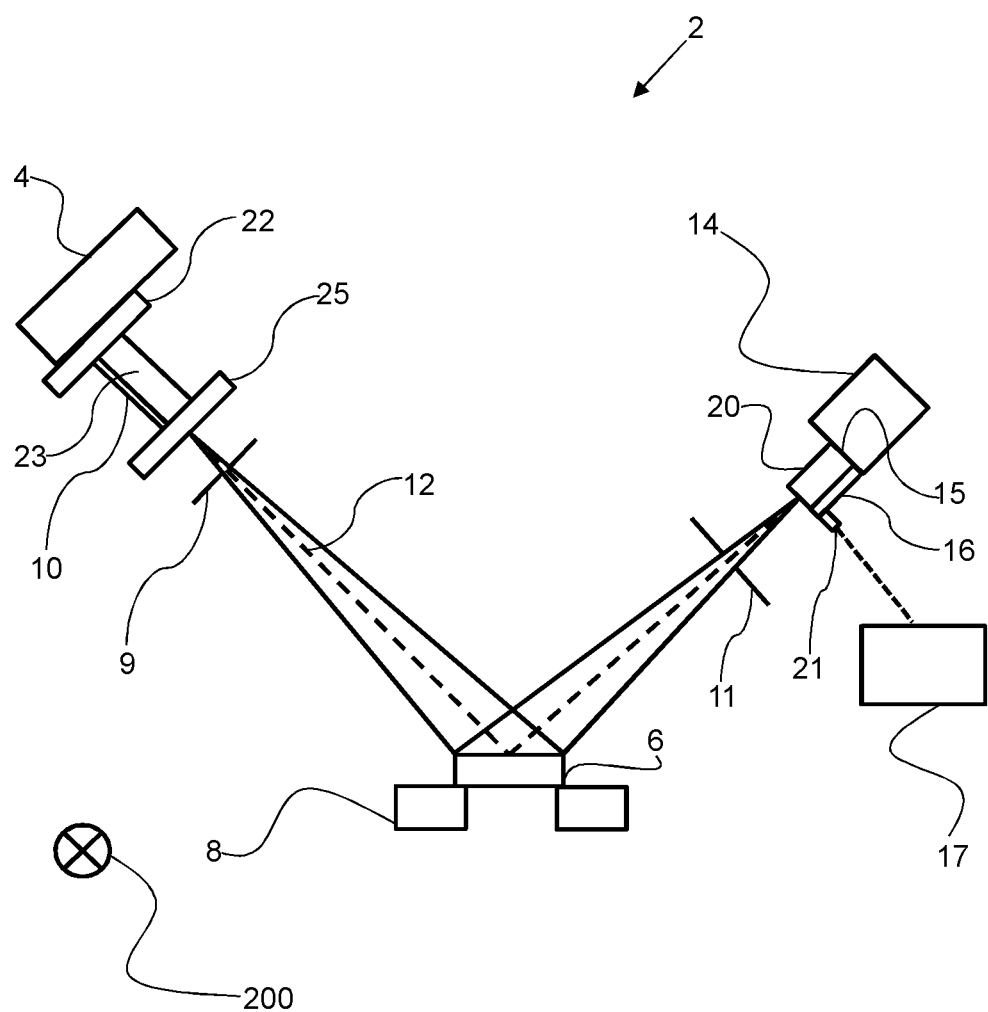
FIG. 2 is a schematic diagram of the X-ray analysis apparatus of FIG. 1, wherein the second collimator is in the first configuration.

Referring to FIG. 2, the X-ray analysis apparatus 2 is shown with the first collimator 18 and the second collimator 20 in different configurations to those shown in FIG. 1. In FIG. 2, the first collimator 18 is in its second configuration (outside of the diffracted X-ray beam) and the second collimator 20 is arranged in its first configuration (in the diffracted X-ray beam). To change the configuration from the first configuration (shown in FIG. 1) to the second configuration (shown in FIG. 2) the first actuator arrangement 21 moves the first collimator 18 and the second collimator 20 in an axial direction. That is, the first actuator arrangement 21 moves the first collimator 18 and the second collimator 20 in a direction extending out of the plane of the page.

The first collimator 18 and the second collimator 20 can also be arranged so that both collimators are in the second configuration. That is, neither the first collimator 18 nor the second collimator 20 is arranged in the diffracted X-ray beam. In this configuration, the X-ray detector 14 receives an X-ray beam diffracted by the sample 6 in a direction towards the detection region 15 of the detector 14, wherein neither the first collimator 18 nor the second collimator 20 are in the X-ray beam. Accordingly, the X-ray apparatus 2 provides even greater flexibility since X-ray analysis measurements can be carried out without the first or second collimator in the X-ray beam path.

Furthermore, because the first collimator 18 and the second collimator 20 can be arranged outside of the diffracted X-ray beam path, the X-ray analysis apparatus 2 can be configured for use in X-ray analysis measurements in which no collimator is required. For example, in a SAXS measurement, it is not usually necessary to collimate the beam scattered by the sample. Accordingly, to carry out a SAXS measurement, the first and second collimator can be arranged outside of the scattered X-ray beam path (each collimator is arranged in its second configuration). The incident beam is restricted using appropriate beam optics, using the first mask wheel 22 and the second mask wheel 25. The scattered beam is received by the X-ray detector 14 without passing through the first collimator 18 or the second collimator 20.

In the embodiment illustrated in FIGS. 1 and 2 the X-ray analysis apparatus 2 comprises two collimators; the first collimator and the second collimator. However, in some embodiments the X-ray analysis apparatus includes more than two collimators.

Figure 9:
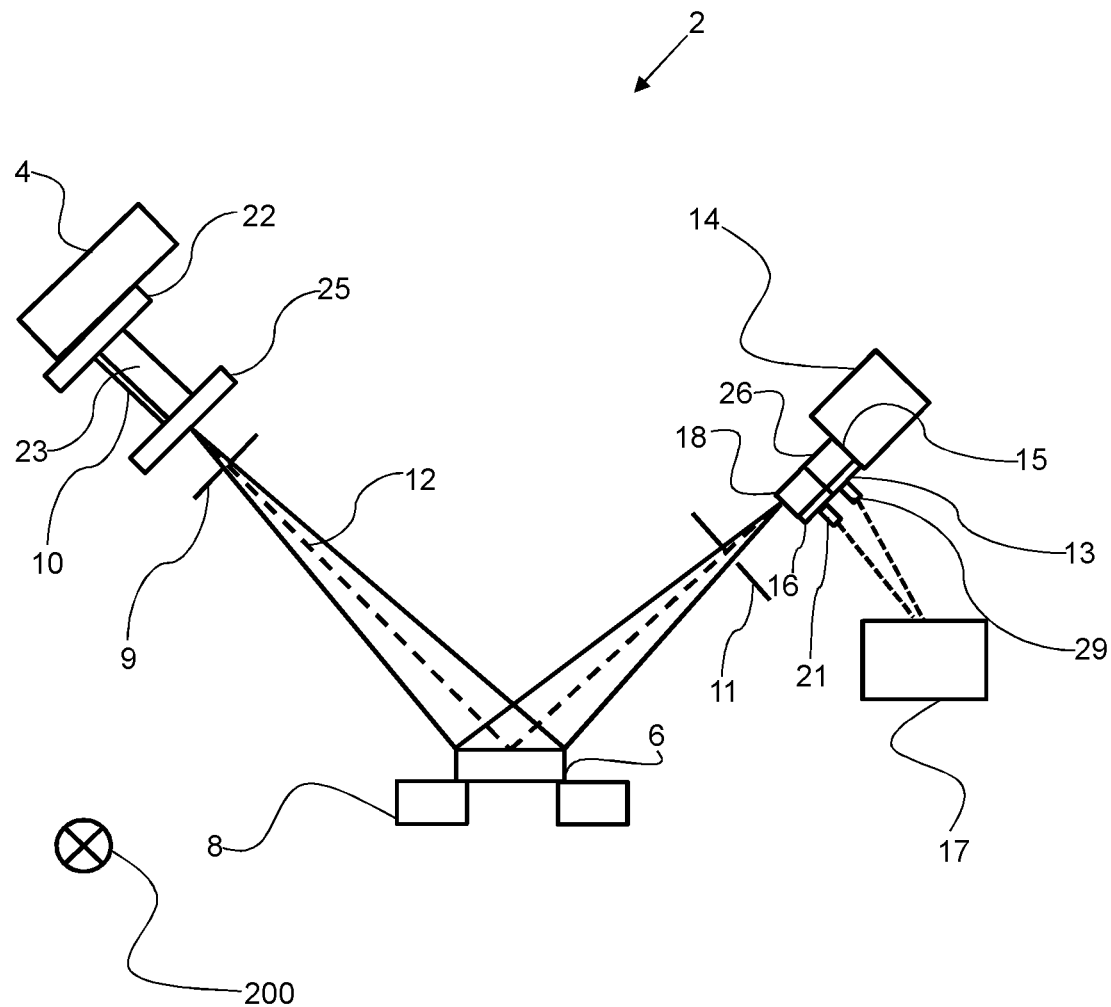
FIG. 9 is a schematic diagram of an embodiment of the X-ray analysis apparatus, in a cross sectional side view, wherein the first collimator and the third collimator are in the first configuration.

FIG. 9 shows such an embodiment. In the embodiment illustrated in FIG. 9, the X-ray analysis apparatus comprises three collimators. In addition to the first and second collimators 18, 20 described in relation to FIGS. 1 and 2, the X-ray analysis apparatus also includes a third collimator 26 which is arranged between the first collimator 18 and the detector 14. The first and second collimators are both Soller slit collimators. The third collimator 26 is a parallel plate collimator. In FIG. 9, both the first collimator 18 and the third collimator 26 are shown in the first configuration. The second collimator (not shown) is in the second configuration. The first actuator arrangement 21 acts on the first support component 16 to move the first collimator 18 and the second collimator between the first configuration and the second configuration. Similarly, the second actuator arrangement 29 acts on the second support component 13 to move the third collimator 26 between the first configuration and the second configuration. In other embodiments, the third collimator is a Soller slit collimator and the first and second collimators are parallel plate collimators.

Figure 10:
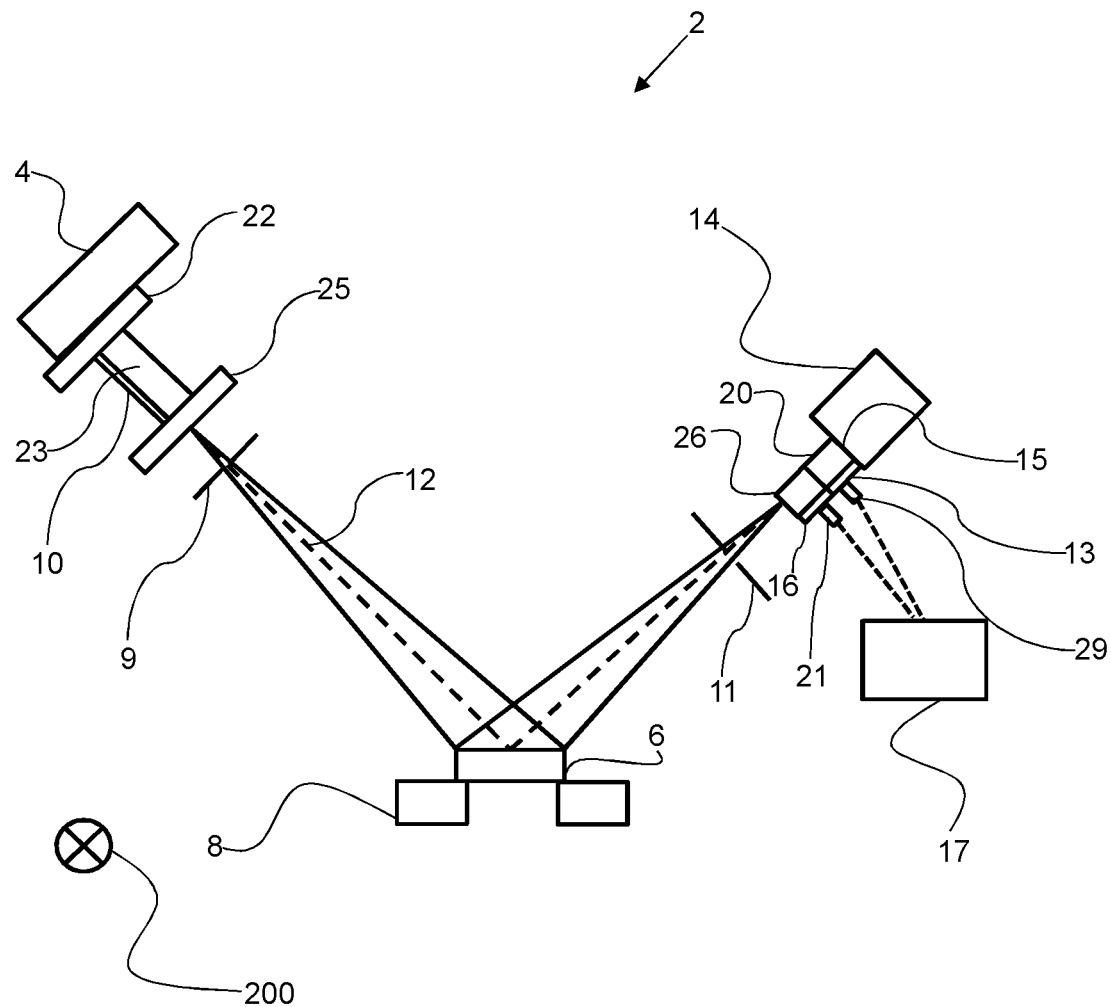
FIG. 10 is a schematic diagram of an embodiment of the X-ray analysis apparatus, in a cross sectional side view, wherein the second collimator and the third collimator are in the first configuration.

FIG. 10 shows another embodiment, in which the X-ray analysis apparatus comprises three collimators. In this embodiment, the third collimator 26 is arranged between the sample and the first collimator 18. In FIG. 10, the first collimator 18 (not shown) is in the second configuration, the second collimator 20 is in the first configuration, and the third collimator 26 is in the first configuration. In this embodiment, the first and second collimators are parallel plate collimators and the third collimator is a Soller slit collimator. In other embodiments (for example, see FIG. 3)

the first and second collimators are Soller slit collimator and the third collimator is a parallel plate collimator).

Figure 3:
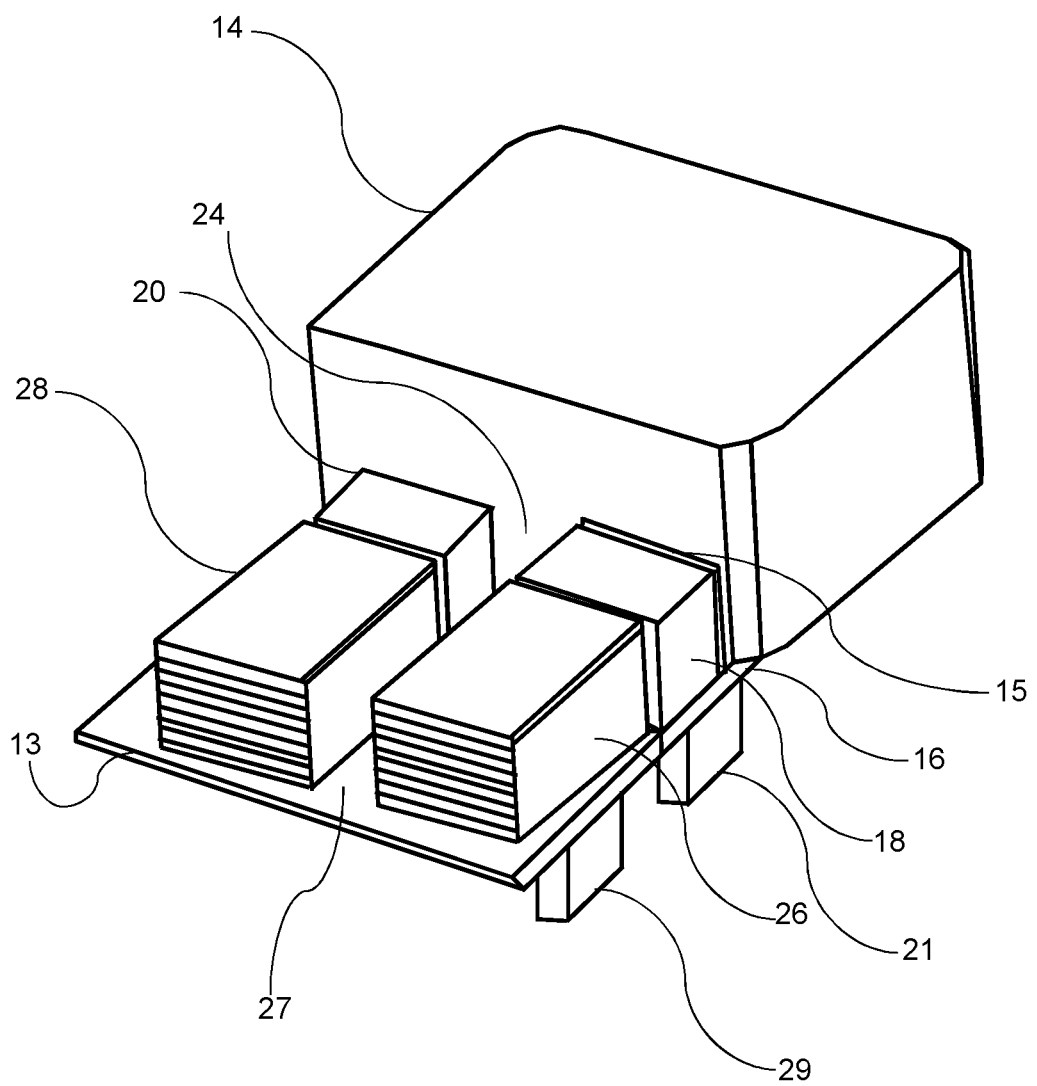
FIG. 3 shows a perspective view of a collimator arrangement and an X-ray detector for use in an embodiment of the invention.

FIG. 3 shows another embodiment, in which the X-ray analysis apparatus comprises four different collimators for limiting the divergence of the X-ray beam from the sample. In the embodiment illustrated in FIG. 3, the first collimator and the second collimator are Soller slit collimators. The other two collimators are parallel plate collimators, for limiting the equatorial divergence of the X-ray beam. In the arrangement in FIG. 3, the angular divergence of the third collimator is smaller than the angular divergence of the fourth collimator.

The first collimator 18 and the second collimator 20 are mounted to a first support component 16. The angular divergence of the first collimator 18 is smaller than the angular divergence of the second collimator 20. The first collimator 18 and the second collimator 20 are arranged on the first support component 16 so as to be spaced apart. That is, a gap 24 is provided between the first and second collimator. When the gap 24 is aligned with the detection region 15 of the detector, neither the first collimator 18 nor the second collimator is arranged in the diffracted X-ray beam i.e. the first collimator 18 and the second collimator are both in their second configurations. Accordingly, neither collimator are in the diffracted/scattered X-ray beam.

The first collimator 18 and the second collimator 20 are fixed to the first support component 16, and are rigidly coupled to one another. The first actuator arrangement 21 is arranged to move the first support component 16, in response to a signal from the controller 17. In this way, the first collimator 18 and the second collimator 20 are moved together in order to change the configuration of at least one of the collimators. For example, initially the first collimator 18 is in the first configuration and the second collimator 20 is in the second configuration. If the controller 17 causes the first actuator arrangement to move the first support component 16 so that the gap 24 is arranged in the X-ray beam path, neither the first collimator nor the second collimator is arranged in the X-ray beam path. Therefore, the first collimator is in its second configuration and the second collimator is in its second configuration.

The X-ray analysis apparatus also comprises a third collimator 26 and a fourth collimator 28, which are mounted to a second support component 13. The third and fourth collimators are parallel plate collimators for limiting the equatorial divergence of the X-ray beam. A second actuator arrangement 29 is arranged to act on the second support component 13 to move the third collimator 26 and the fourth collimator 28. The second support component 13 is arranged between the first support component 16 and the sample stage 8. The first support component 16 and the second support component 13 can be moved independently of one another. Therefore, the first and second collimators are arranged to move independently to the third and fourth collimators. Accordingly, a number of different combinations of the first or second collimator with the third or fourth collimator is possible. This provides the user with flexibility in terms of which X-ray optics are provided in the X-ray beam path between the sample 6 and the detector 14.

The third collimator 26 and the fourth collimator 28 are arranged so as to be spaced apart. That is, a gap 27 is provided between them. Accordingly, the third collimator 26 and the fourth collimator 28 can be positioned such that neither the third collimator 26 nor the fourth collimator 28 is arranged in the X-ray beam path between the sample and the detector. That is, the third collimator is in its second configuration and the fourth collimator is in its second configuration. Accordingly, neither the third collimator 26 nor the fourth collimator 28 interrupts the X-ray beam.

Figure 4:
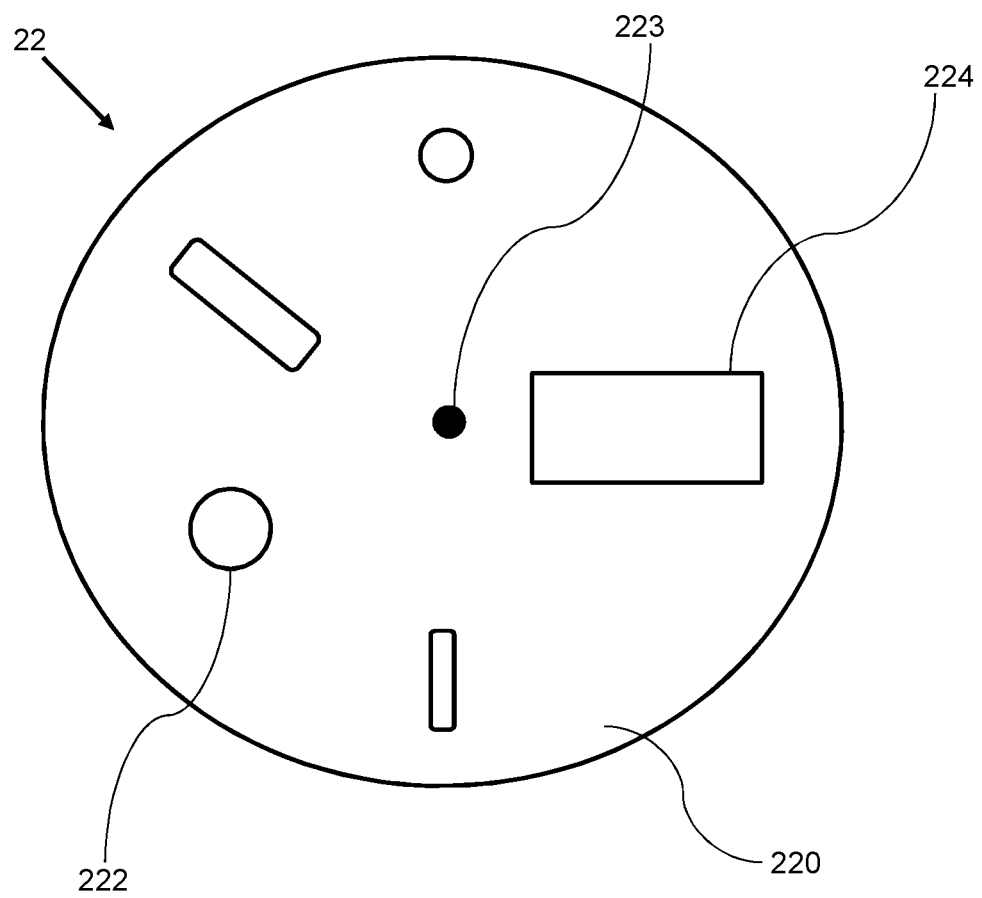
FIG. 4 shows a schematic diagram of a beam mask component.

FIG. 4 is a schematic diagram of a first beam mask component 22 according to an example; in this example, the first beam mask component is a mask wheel.

The first beam mask component 22 comprises a body 220 and a plurality of openings. The first opening 222 is a first aperture for limiting the beam size of the incident X-ray beam. The first beam mask component 22 also includes a second opening 224. The second opening is a relatively large opening that allows the line focus of the X-ray tube to pass through without interruption.

The first beam mask component 22 is arranged to be rotatable about its axis 223. A first beam mask component actuator (not shown) is configured to rotate the first beam mask component 22 about its axis 223. The first beam mask component 22 is arranged relative to the X-ray tube such that when the first beam mask component 22 is rotated about its axis 223, the opening arranged in the incident X-ray beam path is changed.

In embodiments, each mask wheel has a plurality of beam masks formed in the body. The mask wheels comprise a material that absorbs X-rays, for example brass, and each mask wheel is rotatable about its centre. For example, each mask wheel can be formed of a plate of X-ray absorbent material. In embodiments, the first beam mask component comprises one or multiple further masks and/or attenuators. For example, the first mask wheel and/or the second mask wheel may comprise masks having a size of 0.1 mm to 0.6 mm. The controller is configured to control the configuration of the first beam mask component and the second beam mask component.

By providing this arrangement, the beam optics in the incident beam path can be conveniently reconfigured. Accordingly, the X-ray analysis apparatus can be used for multiple different applications. Different combinations of incident and diffracted beam optics can be provided, without the need for an expert user to carry out extensive work in order to reconfigure the apparatus.

In some methods of controlling the X-ray analysis apparatus 2, the configuration of the first collimator and the second collimator is automatically selected based on the type of measurement to be carried out (e.g. the analysis technique used, or the type of sample). In some methods, the configuration of the first collimator and optionally the second collimator can be changed during the measurement of a sample. In some methods, X-ray analysis measurements are carried out on a batch of samples and the configuration of the first collimator and optionally the second collimator is changed after measuring one of the samples in the batch and before measuring the next sample in the batch. In some methods of analysis of a sample, the configuration of the first collimator and optionally the second collimator is determined based on the results of an initial X-ray analysis measurement on the sample.

Figure 5A:
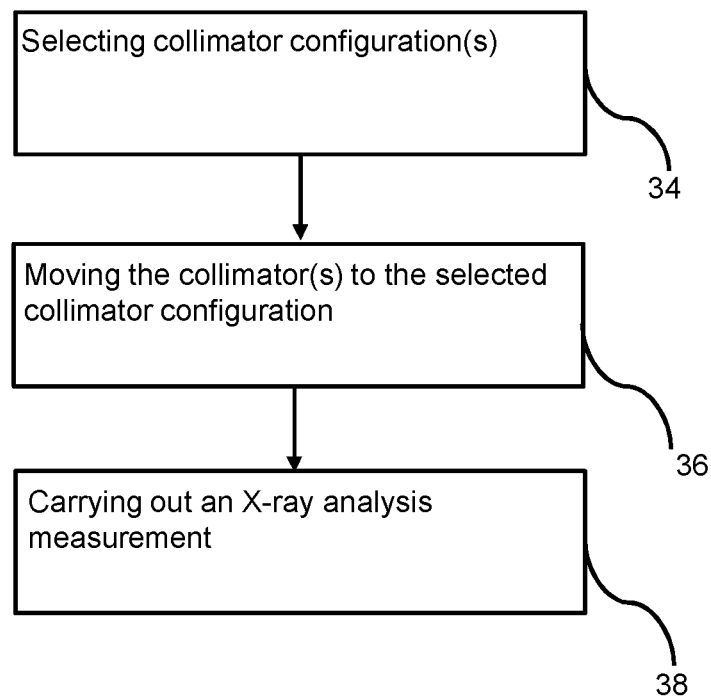
FIG. 5a illustrates a method for making X-ray analysis measurements according to an embodiment of the invention.

FIG. 5a illustrates a method of controlling an X-ray analysis apparatus 2 according to an embodiment of the invention. The method includes a first step 34, in which a collimator configuration is selected for each collimator of the X-ray analysis apparatus. In this example, the X-ray analysis apparatus comprises a first collimator and a second collimator. Therefore, the controller selects a configuration for the first collimator and a configuration for the second collimator. In a subsequent step 36, the controller controls the first actuator arrangement 21 to move the first collimator and the second collimator to the selected collimator configurations. In a further step 38, an X-ray analysis measurement is carried out.

For example, in one embodiment, the controller 17 is pre-configured with a set of configurations. For each different type of X-ray analysis measurement, the controller has a pre-set configuration for each of the first collimator and the second collimator. For example, the controller may be configured to conduct measurements in any of Bragg Brentano mode, SAXS mode, GISAXS mode, Thin Film Phase Analysis mode, Reflectometry mode etc. For each type of X-ray analysis measurement, there is a specific set of collimator configurations. The user selects a measurement mode and the controller determines which collimator configurations are appropriate by determining which collimator configurations are associated with the selected measurement mode. The controller then sends a control signal to the first actuator arrangement and/or the second actuator arrangement to cause the first actuator arrangement and/or the second actuator arrangement to move the collimators to those configurations.

In a Bragg Brentano measurement, a Soller slit collimator is usually positioned in the diffracted X-ray beam path. In an example, the controller is configured with a Bragg Brentano measurement mode, in which either the first collimator or the second collimator (which are Soller slit collimators) is arranged in the diffracted X-ray beam path. That is, one of the first collimator and the second collimator is in its first configuration.

The third collimator and fourth collimator, if present, can be controlled in the same way. In Bragg Brentano mode, the parallel plate collimator is not required. Accordingly, if the X-ray apparatus also includes a third collimator and a fourth collimator (which are parallel plate collimators), the controller is configured to cause the second actuator arrangement to move the third and fourth collimators to their second configurations. Accordingly, neither the third collimator nor the fourth collimator is arranged in the diffracted X-ray beam path. In this way, a diffracted X-ray beam will not pass through the third collimator or the fourth collimator. However, the diffracted X-ray beam will pass through the first collimator or the second collimator since it is arranged in the diffracted X-ray beam path.

In other measurement modes, different combinations of collimators are provided.

For example, in Grazing Incidence X-ray Diffraction measurements (Thin Film Phase Analysis), the incident X-ray beam strikes the sample at a small angle (e.g. less than 5 degrees). A GI-XRD measurement is made on a sample by detecting the X-rays diffracted by the sample at different angles. A parallel plate collimator is usually provided in the diffracted X-ray beam. Therefore, if a Grazing Incidence X-ray Diffraction mode is chosen, the third collimator is arranged in the diffracted X-ray beam (the third collimator is in its first configuration and the fourth collimator is in its second configuration) or the fourth collimator is arranged in the diffracted X-ray beam (the fourth collimator is in its first configuration and the third collimator is in its second configuration). A Soller slit collimator can also be provided in the diffracted X-ray beam. In this case, one of the first collimator 18 and the second collimator 20 can be arranged in the diffracted X-ray beam. Alternatively, neither of the first and the second collimator is arranged in the diffracted X-ray beam.

In another example, the controller receives a signal indicating that a texture measurement is to be performed. For a texture measurement, no parallel plate collimator is required. Accordingly, the controller controls the second actuator arrangement to move each of the third collimator and the fourth collimator to its second configuration, so that neither the third nor the fourth collimator is in the X-ray beam. In an example, a Soller slit collimator may be used, so the controller controls the first actuator arrangement to move the first collimator and the second collimator such that one of the first collimator or the second collimator is arranged in the X-ray beam path.

In another embodiment, the controller is pre-configured to select the collimator configuration(s) based on the type of sample to be analysed. For example, the user inputs information identifying the type of sample to be analysed. The controller compares this information to a database to determine whether a high-resolution scan or a low-resolution scan is required. The database provides information about what type of scan is required for different materials. More specifically, the database has multiple entries. Each entry may correspond to a different material. For each material, the database specifies that either a high-resolution scan or a low-resolution scan is appropriate/optimal. The first collimator has a smaller angular divergence than the second collimator. If a high-resolution scan is required, the controller moves the first collimator to the first configuration and the second collimator to the second configuration, so that a relatively small angular divergence collimator is provided in the diffracted X-ray beam path. If a low-resolution scan is required, the controller moves the first collimator to the second configuration and moves the second collimator to the first configuration, so that a relatively large angular divergence collimator is provided in the X-ray beam path.

In an embodiment, the collimator configurations are changed during a batch of measurements. In this embodiment, the sample holder comprises multiple containers. Each container holds a different sample. The samples may be of different materials to one another, or some of the sample may be of the same material. During a measurement, the sample holder is controlled to position a single container in the incident X-ray beam path. The controller controls the sample holder to move the containers, in order to exchange the container arranged in the X-ray beam path for another container. In this way, X-ray measurements are carried out on a batch of samples, without user intervention. The controller is also configured to change the configuration of each of the collimators, so that the collimator in the X-ray beam from the sample to the detection region can be changed during a batch of measurements, without user intervention. In this way, different types of X-ray analysis methods can be carried out on different samples in the batch. Alternatively, the same X-ray analysis method may be carried out on different samples in the batch, but X-ray beams of different angular divergence can be allowed to pass through to the detector for different samples (by changing the collimator configuration). For example, in GI-XRD measurements, the configuration of the parallel plate collimators can be changed to optimise results, depending on the type of sample to be analysed.

Figure 5B:
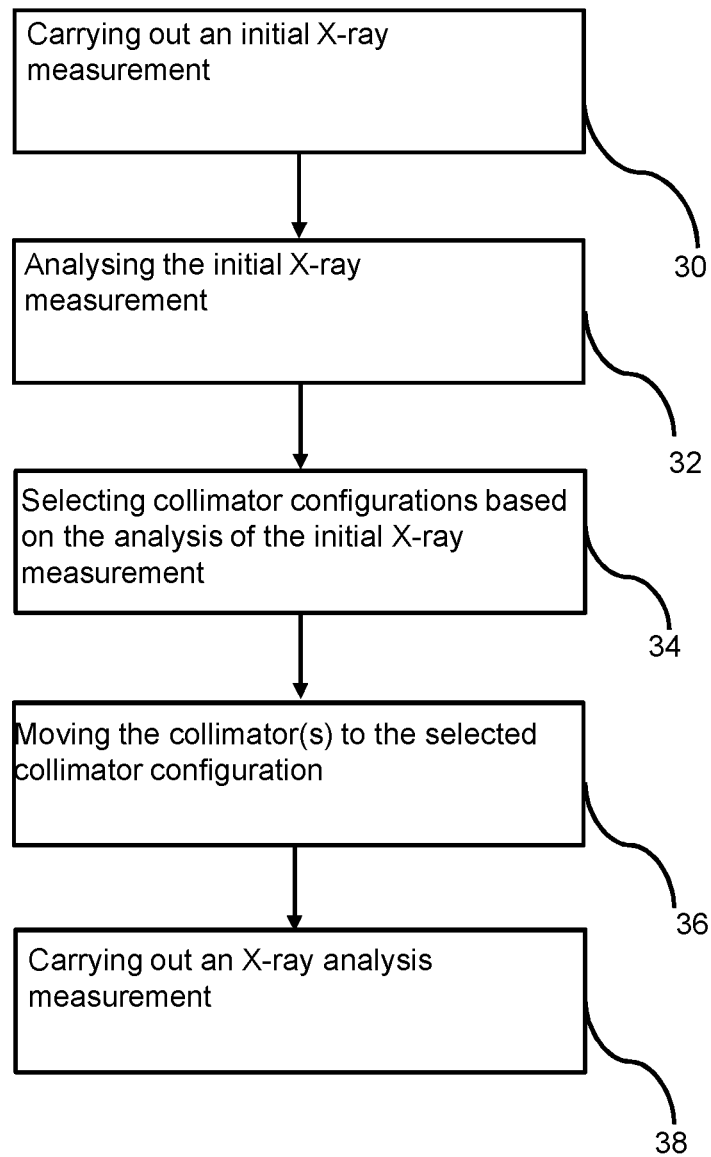
FIG. 5b illustrates a method for making X-ray analysis measurements, according to another embodiment of the invention.

In the embodiment illustrated by FIG. 5b, the collimator configurations for an X-ray analysis measurement are selected based on the results of an initial X-ray analysis measurement.

In the initial measurement step 30, the first collimator and the second collimator are arranged in a default configuration. For example, the controller is pre-programmed with default configurations for the first and second collimator and controls the first actuator arrangement to move the first and second collimator to their default configurations. Then, the controller controls the X-ray analysis apparatus to carry out an initial X-ray analysis measurement. Then, in an initial analysis step 32, the results of the initial X-ray measurement are analysed. This can provide the advantage that the collimator configuration can be chosen based on the results of the initial X-ray measurement.

For example, the controller may determine whether the small or high angular divergence collimator configuration is appropriate based on an initial scan of the sample. In this embodiment, the controller carries out a rapid scan of the sample and analyses the scan to determine whether the scan could be optimised by changing the collimator arranged in the X-ray beam. The scan is rapid because measurements are taken at a relatively low number of measurement positions, and/or a low intensity scan is carried out.

One way of analysing the initial scan is to identify the highest intensity peak and compare the intensity of this peak to a threshold intensity. If the intensity of this peak is above the threshold, then the measurements can be optimised by using a collimator with a smaller angular divergence to gain higher resolution. If the intensity of the peak is below the threshold, then the measurements can be optimised by using a collimator with a larger angular divergence.

Another way of analysing the initial scan is to identify a peak of interest—to identify a peak positioned over a particular range of angles—and to compare the intensity/width of the peak of interest to a threshold value.

Yet another way of analysing the initial scan is to calculate the average intensity of multiple peaks of the scan, for example all of the peaks or a subset of the peaks.

In another embodiment, the initial scan is analysed by calculating the peak asymmetry of one or more peaks. In particular, peak asymmetry can be used to select the optimal configuration for the Soller slit collimator(s).

For example, the peak asymmetry of a peak is calculated by carrying out the following steps. Firstly, the angular position at maximum intensity of the peak is determined. Next, for each side of the peak, the angular positions of the peak at a lower intensity is determined (for example, the angular positions at the FWHM). The difference in the angular position of the maximum intensity and the angular position of the peak at the full width is evaluated for each side of the peak. The difference between these two values is a measure of peak asymmetry.

Another way of analysing the scan is to determine the Full Width at Half Maximum of at least one of the peaks in the scan. In this case, the number of measurements (i.e. angular positions) taken across the FWHM of a peak is determined.

In some embodiments, the number of measurements (i.e. angular positions) taken across the width of the FWHM of a peak, for a given measurement step size, is compared to a width threshold value (corresponding to that step size) to determine whether the peak is too wide. That is, to determine whether resolution is high enough. If the number of measurements is higher than the width threshold value, the controller determines that a collimator with a smaller angular divergence should be used.

In some embodiments, peaks at high angles of 2θ (for example peaks positioned at angles of 2θ greater than 40 degrees) resolution may be less important (i.e. less affected by the collimators). Accordingly, the controller may be configured to control the collimators to increase intensity (to use a collimator having higher angular divergence or no collimator) if the width of one or more peaks is above a threshold value.

X-ray diffraction measurements can be optimised by balancing the need for high resolution and high intensity. At low angles of 2θ, for example below 40 degrees, measurement peaks typically have a high maximum intensity and it is important to have good resolution. At higher angles, for example above 40 degrees, resolution is less affected by the collimators but the intensity is typically low which leads to long measurement times. In embodiments, the controller 17 is configured to change the configuration of the first collimator 18 and the second collimator 20 during the X-ray diffraction measurement. The controller 17 may be configured to change the configuration of the first collimator 18 and the second collimator 20 when the detector 14 reaches a threshold angle $\theta_T$. For example, the controller 17 is configured to control the apparatus 2 so that the first collimator 18 is in the first configuration and the second collimator 20 is in the second configuration for angles of 2θ between 0 to 40 degrees. At angles above 40 degrees, the controller 17 sends a control signal to the first actuator arrangement 21 to move first collimator 18 to the second configuration and the second collimator 20 to the first configuration. In particular, for Bragg Brentano measurements, the configuration of the Soller slit collimators can be changed to optimise results. The controller can be configured to change the configuration of parallel plate collimators, during an in-plane measurement, in a similar way. In-plane measurements are X-ray diffraction measurements in which the incident and diffracted beams are nearly parallel to the sample surface. The penetration depth of the beam is about 100 nm deep, which is useful for thin film characterisation.

In this way, the results of the 2θ scan of a sample can be optimised to achieve both high intensity and good peak resolution, across all of the angles in the 2θ scan. Accordingly, it is possible to achieve both high resolution and good intensity/shorter measurement times, in a single, continuous, 2θ scan of a sample.

It will be appreciated that the controller can be configured to control the third collimator 26 and the fourth collimator 28 in the same way, for example with the first collimator 18 and the second collimator 20 arranged outside of the X-ray beam (both the first collimator and the second collimator are in the second configuration).

In some embodiments, the threshold angle is selected by a user before the measurement is conducted.

In other embodiments, the controller 17 is configured to determine the optimal threshold angle. In this case, the controller 17 is configured to conduct an initial scan of the sample, and to analyse the results of the initial scan to determine a threshold angle. The initial X-ray measurement is carried out before performing the collimator configuration step. The results of the initial scan are used to estimate the quality of the results that can be obtained in a particular collimator configuration. The detector 14 takes measurements at various angles, 2θ, to measure a plurality of diffraction peaks. By analysing the measurement peaks at different angles of 2θ, the optimal threshold angle can be determined.

For example, the detector takes measurements at angles of 2θ from 0 to 120 degrees, with the first collimator or the second collimator in the first configuration. The detector detects a plurality of diffraction peaks at respective angles of 2θ. The controller determines the maximum intensity of each of the diffraction peaks and compares the maximum intensity of each peak to an intensity threshold value. In this way, the controller determines an angular range for which intensity is above/below the threshold value. For example, the scan is carried out with the first collimator in the first configuration and, at angles above 60 degrees the maximum intensity of each diffraction peak is below the threshold value and at angles below 60 degrees the maximum intensity of each peak is above the threshold value. Accordingly, the controller determines that the optimal threshold value is 60 degrees. The controller is accordingly configured to move the first collimator to the second configuration at angles of 2θ above 60 degrees and optionally to move the second collimator to the first configuration at angles above 60 degrees.

Tables 1 and 2 illustrate a number of different configurations that can be used with the X-ray analysis apparatus, to perform different X-ray analysis measurements. Each row relates to a different X-ray analysis measurement and each column relates to a piece of X-ray analysis equipment. The table indicates possible combinations of equipment for use with different measurements. In particular, the parallel plate collimator column and the Soller slit collimator column indicate example configurations for the collimators.

TABLE 1

Exemplary X-ray Analysis Configurations for Different X-ray Analysis Methods

| X-ray Analysis Method | First Beam Mask Component | Second Beam Mask Component | First and Second collimators (Soller Slit Collimators) | Third and Fourth Collimators (Parallel Plate Collimators) |
|---|---|---|---|---|
| 2D micro-diffraction | Mask | Mask | Both collimators in second configuration | Both collimators in second configuration |
| 1D micro-diffraction | Mask | Mask | One of the first collimator and the second collimator in first configuration | Both collimators in second configuration |
| Bragg-Brentano (powder diffraction) | Open | Open or Mask | Both collimators in second configuration or one of the first collimator and the second collimator in first configuration | Both collimators in second configuration |
| Phase analysis on rough surfaces | Open | Mask | One of the first collimator and the second collimator in first configuration | One of the third collimator and the fourth collimator in first configuration |
| 1D SAXS | Attenuator (for low angles only) | Open | Both collimators in second configuration | Both collimators in second configuration |
| Reflectometry | Attenuator (for low angles only) | Open | One of the first collimator and the second collimator in first configuration | Both collimators in second configuration |
| Thin film phase analysis | Open | Open or Mask | One of the first collimator and the second collimator in first configuration | One of the third collimator and the fourth collimator in first configuration |
| Topography | Open | Small mask | Both collimators in second configuration | Both collimators in second configuration |
| GISAXS | Small mask | Small mask | Both collimators in second configuration | Both collimators in second configuration |
| Residual Stress | Mask or Open | Mask or Open | Both collimators in second configuration or one of the first collimator and the second collimator in first configuration | Both collimators in second configuration or one of the third collimator and the fourth collimator in first configuration |
| Texture | Mask or Open | Mask or Open | Both collimators in second configuration or one of the first collimator and the second collimator in first configuration | Both collimators in second configuration |

TABLE 2

Exemplary X-ray Analysis Configurations
for Different X-ray Analysis Methods

| X-ray Analysis Method | Programmable Divergence Slit | Programmable Anti-Scatter Slit | Detector |
|---|---|---|---|
| 2D micro-diffraction | Small opening | Open | 2D Mode |
| 1D micro-diffraction | Small opening | Open | 1D Mode |
| Bragg-Brentano (powder diffraction) | Controlled opening | Controlled opening | 1D Mode |
| Phase analysis on rough surfaces | Small Opening or Wide Opening | Open | 0D Mode |
| SAXS | Small Opening | Small Opening | Small active area |
| Reflectometry | Small Opening | Small Opening | Small active area |
| Thin film phase analysis | Small Opening | Open | 0D Mode |
| Topography | Small Opening or Wide Opening | Open | 2D Mode |
| GISAXS | Small Opening | Open | 2D Mode |
| Stress | Depends on Sample Area | Open | 1D/2D/0D Mode |
| Texture | Depends on Sample Area | Open | 1D/2D/0D Mode |

For SAXS measurements, the first beam mask component is configured so that the attenuator portion is arranged in the beam for very low angles. After measurements have been carried out at very low angles, the configuration of the first beam mask component is changed. The same applies to Reflectometry measurements. For SAXS measurements, very low angles are, for example, angles of 0.05 degrees to 0.5 degrees. For Reflectometry measurements, very low angles are, for example, angles between 0.3 and 1.5 degrees.

Figure 6:
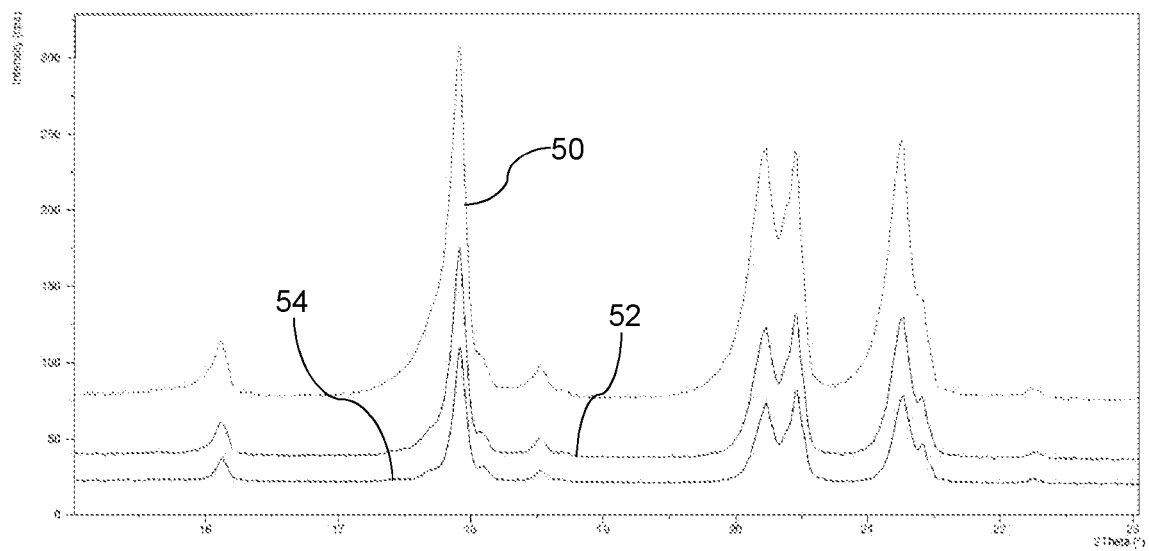
FIG. 6 shows the effect of Soller slit collimators on peak intensity.

FIG. 6 shows the effect of the angular divergence of a Soller slit in a diffracted X-ray beam path on intensity, for a sample of NaPbVO4. The number of counts per second is plotted along the y-axis, with angular position along the x-axis. It can be seen that the different scans correspond to the same angular range. The highest intensity scan 50 was measured without a Soller slit collimator in the beam path from the sample to the detector. The next highest intensity scan 52 was measured using a Soller slit collimator having a large angular divergence in the beam path from the sample to the detector. The lowest intensity scan 54 was measured with a collimator having a small angular divergence in the beam path from the sample to the detector. It can be seen that as the angular divergence of the Soller slit collimator increases, so does intensity.

Figure 7:
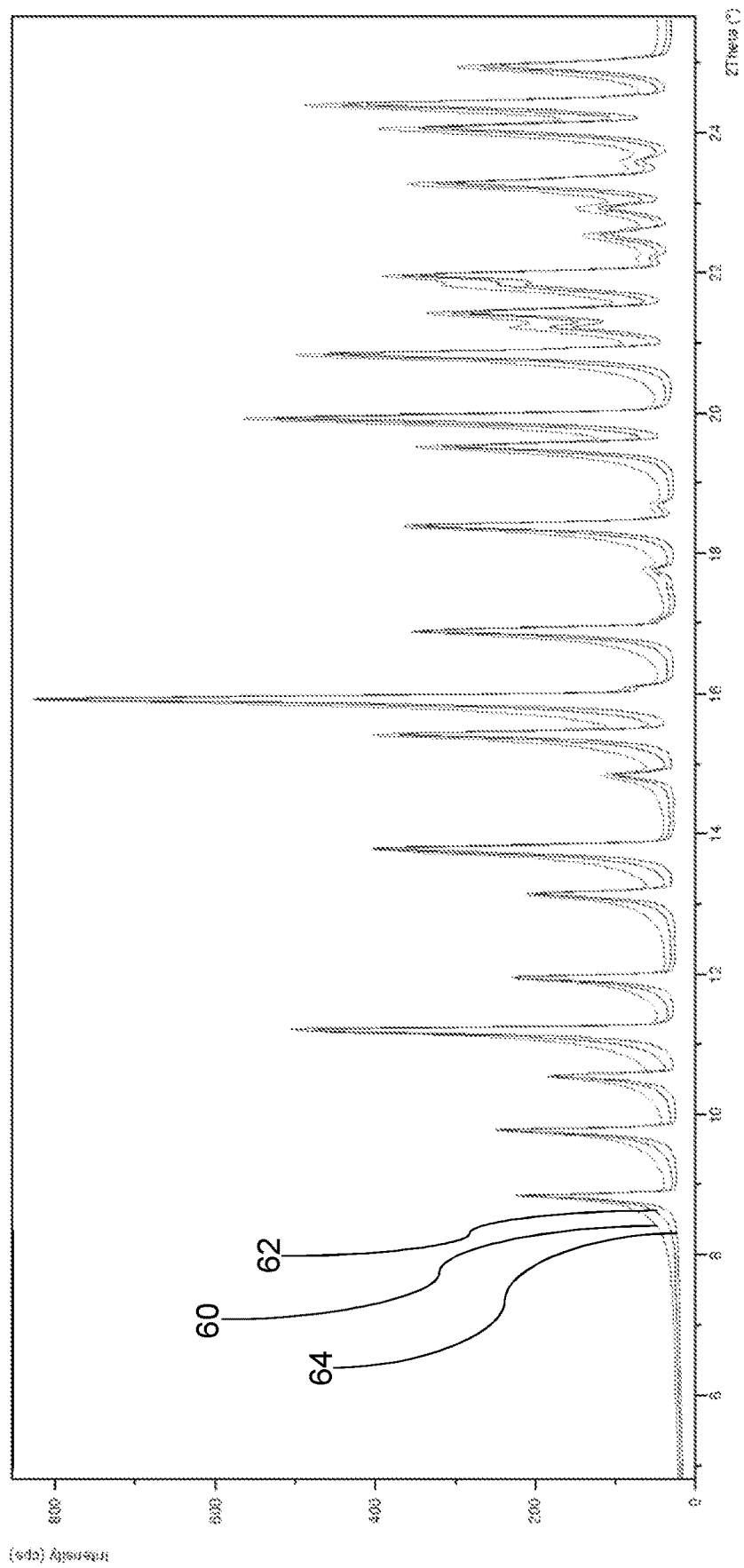
FIG. 7 shows the effect of Soller slit collimators on peak asymmetry at low angles, for a different sample (the diffractogram is scaled to the height of the strongest peak)

FIG. 7 shows the influence of a Soller slit collimator in the diffracted X-ray beam on peak asymmetry for a tetracycline HCL sample at low angles. The scans are normalised to the same maximum intensity. At these low angles, there is a significant difference in peak shape between the different scans. FIG. 7 includes a first scan 60, which was taken with no Soller slit in the diffracted beam path, a second scan 62 which was taken with a Soller slit having a large angular divergence in the diffracted beam path, and a third scan 64 which was taken with a Soller slit collimator having a small angular divergence in the diffracted beam path. FIG. 7 shows that, at these angles of 2θ, peak asymmetry is significantly reduced by using a Soller slit collimator in the diffracted X-ray beam path.

Figure 8:
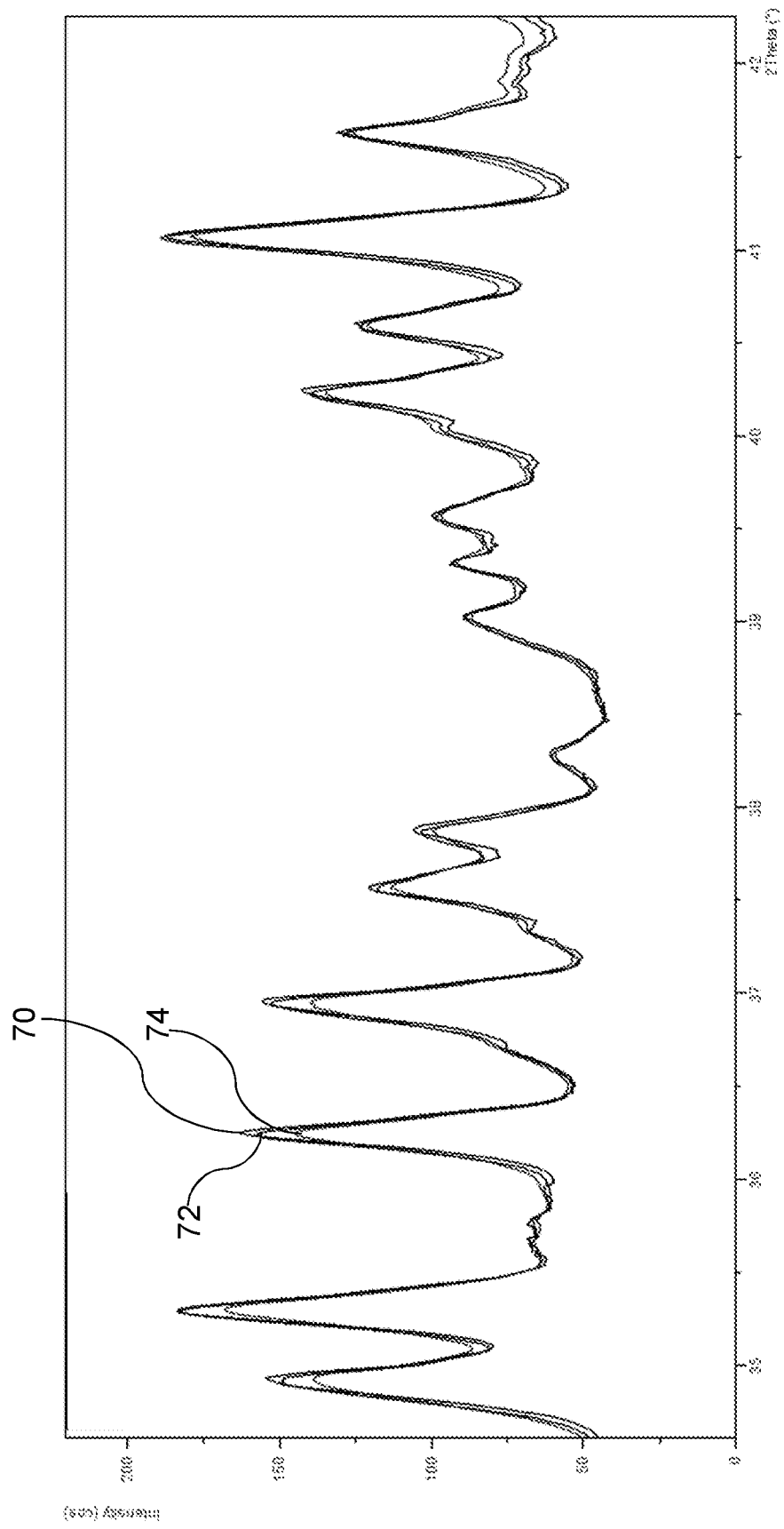
FIG. 8 shows the effect of Soller slit collimators on peak asymmetry for the sample as FIG. 7, at higher angles (the diffractogram is scaled to the height of the strongest peak)

FIG. 8 shows the influence of a Soller slit collimator in the diffracted beam path, for higher angles. The scans are normalised to the same maximum intensity. It can be seen that at these higher angles, the peak shape between different scans is similar. FIG. 8 includes a first scan 70, which was taken with no Soller slit in the diffracted 2θ beam path, a second scan 72 which was taken with a Soller slit having a large angular divergence in the diffracted beam path, and a third scan 74 which was taken with a Soller slit collimator having a small angular divergence in the diffracted beam path. FIG. 8 shows that at these angles, the presence of the Soller slit in the diffracted X-ray beam path does not have as significant of an effect on the peak asymmetry. The difference in peak asymmetry for the different scans in FIG. 7 is much larger than the difference in peak asymmetry for the different scans in FIG. 8.

In any of the methods described above, the controller may be configured to normalise the measured intensity to produce a normalised intensity, based on information about the components of the X-ray analysis apparatus.

In some embodiments, the controller carries out a normalisation calculation by normalising the intensity according to the configuration of the collimators. For example, if the collimator configuration is different in two different regions of the 2θ scan, the normalisation can be carried out so that the two regions can be compared.

This normalisation may be performed by the controller 17. Instead, the normalisation can be carried out by a different entity, such as a processor (not shown). In this case, the processor preferably receives information about the 2θ angle and/or the configuration of the collimators (i.e. which collimator(s) is/are arranged in the diffracted beam path), together with the measured intensity to be normalised.

In some other embodiments, the controller carries out a normalisation calculation by normalising the intensity according to the incident angle for which it was measured, or to normalise the measured intensity according to the configuration of the first beam mask component and optionally the second beam mask component. In particular, the controller is configured to normalise the measured intensity according to the width of the opening(s) arranged in the incident X-ray beam path.

This normalisation may be performed by the controller 17. Instead, the normalisation can be carried out by a different entity, such as a processor (not shown). In this case, the processor preferably receives information about the angle of the incident X-ray beam and/or the configuration of the first beam mask component and optionally the second beam mask component, together with the measured intensity to be normalised.

The skilled person will understand that variations of the embodiments discussed above may be provided. For example, in alternative embodiments the following may be provided.

In some embodiments, the X-ray analysis apparatus includes the first, second, third and fourth collimators. However, in some embodiments, the X-ray analysis apparatus does not include the fourth collimator. In these embodiments, the third collimator may be arranged between the sample and the first collimator or alternatively the third collimator may be arranged between the detector and the first collimator.

In general, if the first and second collimators are Soller slit collimators, the third collimator is preferably a parallel plate collimator. If the first and second collimators are parallel plate collimators, the third collimator is preferably a Soller slit collimator.

In some embodiments, the first collimator and the second collimator are parallel plate collimators, and the third collimator and the fourth collimator are Soller slit collimators.

In some embodiments, the position of the gap may not be provided between the first and second collimators. Instead, the first and second collimators may be provided adjacent to one another, with a gap at one side of the pair of collimators. The same applies to the third and fourth collimators.

The first actuator arrangement may not comprise a worm drive. Instead, the first may comprise any type of actuator suitable for causing the first collimator and/or second collimator to move along the axial direction, for example a pneumatic actuator or any type of electric actuator. The same applies to the second actuator arrangement, in respect of the third collimator and the fourth collimator.

The skilled person will appreciate that the beam mask components need not be round; a plate of material of any shape having masks formed in it can be used for the mask wheel as long as the mask wheel can be rotated about its central axis. The round shape depicted in FIG. 4 is simply one option for the shape of the mask wheel. Alternatively, the masks may be moved in a lateral direction to move in an out of the incident X-ray beam path.

In some embodiments, the first actuator arrangement may be configured to move the first collimator and the second collimator directly, so that the first collimator and the second collimator move relative to the first support component. Alternatively, the first collimator and the second collimator may be fixed to the support, and the first actuator arrangement may be arranged to move the first support component in order to change the collimator configuration. The same applies to the second support component, in respect of the third collimator, the fourth collimator and the second actuator arrangement.

The first actuator arrangement may not move the third collimator and optionally the fourth collimator in an axial direction. Instead, it may be configured to move the first collimator and optionally the second collimator in a different linear direction that intersects the X-ray beam from the sample.

The second actuator arrangement may not move the third collimator and optionally the fourth collimator in an axial direction. Instead, it may be configured to move the third collimator and optionally the fourth collimator in a different linear direction that intersects the X-ray beam from the sample.

The first actuator arrangement may comprise multiple actuators. For example, the first actuator arrangement may comprise a first actuator arranged to move the first collimator and a second actuator arranged to move the second collimator.

The second actuator arrangement may comprise multiple actuators. For example, the second actuator arrangement may comprise a third actuator arranged to move the third collimator and a fourth actuator arranged to move the fourth collimator.

In some embodiments, the first support component and the second support component may be part of a single, unitary body. In such an embodiment, the first actuator arrangement and the second actuator arrangement are configured to move the collimators directly. Alternatively, the first support component and the second support component may be two distinct entities.

In some embodiments, the first collimator and the second collimator are rigidly fixed to each other and the first actuator arrangement is configured to move the position of the first collimator or the second collimator relative to the first support component, which is rigidly fixed to the detector.

In some embodiments, the beam conditioning unit is arranged in the incident X-ray beam path and is fixed in position relative to the X-ray source.

In some embodiments, the beam conditioning unit does not comprise a mirror. In this case, the beam conditioning unit is a Soller slit collimator, arranged in the incident X-ray beam path. The Soller slit collimator may be moveable relative to the X-ray tube, or it may be fixed relative to the X-ray tube.

The invention claimed is:

1. An X-ray analysis apparatus (2) comprising:
a sample stage (8) for supporting a sample (6);
a goniometer having an axis of rotation;
an X-ray detector (14) arranged to be rotatable about the axis of rotation of the goniometer, wherein the X-ray detector (14) is arranged to receive X-rays from the sample directed along an X-ray beam path;
a first collimator (18), a second collimator (20) and a third collimator wherein each of the first, second and third collimators has:
a first configuration, in which the collimator is arranged in the X-ray beam path, and
a second configuration in which the collimator is arranged outside of the X-ray beam path;
a first actuator arrangement (21) configured to move the first collimator (18) between its first configuration and its second configuration by moving the first collimator (18) in a lateral direction that intersects the X-ray beam path, and to move the second collimator (20) between its first configuration and its second configuration by moving the second collimator (20) in a lateral direction that intersects the X-ray beam path;
a second actuator arrangement (29) arranged to move the third collimator (26) between its first configuration and its second configuration by moving the third collimator (26) in a lateral direction that intersects the X-ray beam path; and
a controller (17) configured to:
control the first actuator arrangement (21) to move the first collimator (18) between its first configuration and its second configuration and to move the second collimator (20) between its first configuration and its second configuration; and
control the second actuator arrangement to move the third collimator (26) between its first configuration and its second configuration,
wherein either the first collimator (18) and the second collimator (20) are both Soller slit collimators for limiting the axial divergence of the X-ray beam, wherein an angular divergence of the first collimator (18) is smaller than an angular divergence of the second collimator (20), and the third collimator is a parallel plate collimator for limiting the equatorial divergence of the X-ray beam; or
the first collimator (18) and the second collimator (20) are both parallel plate collimators for limiting the equatorial divergence of the X-ray beam, wherein an angular divergence of the first collimator (18) is smaller than an angular divergence of the second collimator (20), and the third collimator is a Soller slit collimator for limiting the axial divergence of the X-ray beam.

2. The X-ray analysis apparatus (2) of claim 1, wherein the first actuator arrangement is configured to move the first collimator (18) between its first configuration and its second configuration by moving the first collimator (18) in a direction substantially parallel to the axis of rotation.

3. The X-ray analysis apparatus (2) of claim 1, wherein the first collimator (18) is rigidly coupled to the second collimator (20).

4. The X-ray analysis apparatus (2) of claim 1, wherein the third collimator is arranged between the first collimator and the sample or wherein the third collimator is arranged between the first collimator and the detector.

5. An X-ray analysis apparatus (2) comprising:
a sample stage (8) for supporting a sample (6);
a goniometer having an axis of rotation;
an X-ray detector (14) arranged to be rotatable about the axis of rotation of the goniometer, wherein the X-ray detector (14) is arranged to receive X-rays from the sample directed along an X-ray beam path;
a first collimator (18), a second collimator (20) and a third collimator wherein each of the first, second and third collimators has:
a first configuration, in which the collimator is arranged in the X-ray beam path, and
a second configuration in which the collimator is arranged outside of the X-ray beam path;
a first actuator arrangement (21) configured to move the first collimator (18) between its first configuration and its second configuration by moving the first collimator (18) in a lateral direction that intersects the X-ray beam path, and to move the second collimator (20) between its first configuration and its second configuration by moving the second collimator (20) in a lateral direction that intersects the X-ray beam path;
a second actuator arrangement (29) arranged to move the third collimator (26) between its first configuration and its second configuration by moving the third collimator (26) in a lateral direction that intersects the X-ray beam path;
a controller (17) configured to:
control the first actuator arrangement (21) to move the first collimator (18) between its first configuration and its second configuration and to move the second collimator (20) between its first configuration and its second configuration; and
control the second actuator arrangement to move the third collimator (26) between its first configuration and its second configuration,
wherein each of the first collimator, the second collimator and the third collimator is either a Soller slit collimator or a parallel plate collimator; and
a fourth collimator (28) arranged between the first collimator (18) and the sample (6), the fourth collimator (28) having a first configuration in which the fourth collimator (28) is arranged in the X-ray beam path and a second configuration in which the fourth collimator (28) is arranged outside of the X-ray beam path, wherein the second actuator arrangement (29) is configured to move the fourth collimator between its first configuration and its second configuration by moving the fourth collimator (28) in the lateral direction that intersects the X-ray beam path; and
the controller (17) is configured to control the second actuator arrangement (29) to move the fourth collimator (28) between its first configuration and its second configuration.

6. The X-ray analysis apparatus of claim 5 wherein the third collimator and the fourth collimator are arranged between the first collimator and the sample.

7. The X-ray analysis apparatus (2) of claim 6 wherein:
the first collimator (18) and the second collimator (20) are Soller slit collimators; and
the third collimator (26) and the fourth collimator (28) are parallel plate collimators, wherein an angular divergence of the third collimator is smaller than an angular divergence of the fourth collimator.

8. The X-ray analysis apparatus (2) of claim 6 wherein:
the first collimator (18) and the second collimator (20) are parallel plate collimators; and
the third collimator (26) and the fourth collimator (28) are Soller slit collimators, wherein an angular divergence of the third collimator is smaller an angular divergence of the fourth collimator.

9. A method for controlling the X-ray analysis apparatus of any preceding claim to carry out an X-ray analysis measurement, comprising:
in a first configuration selection step (34), selecting a collimator configuration, wherein the collimator configuration comprises the first configuration or the second configuration of the first collimator:
in a subsequent step (36), controlling the first actuator arrangement to move the first collimator to the selected collimator configuration; and
in a further subsequent step (38), carrying out an X-ray analysis measurement on the sample; and
in a second configuration selection step, changing the collimator configuration during an X-ray diffraction or scattering measurement of the sample, based on the angular position of the detector relative to an incident beam.

10. The method of claim 9 further comprising:
in an initial measurement step (30), carrying out an initial X-ray measurement before the first configuration selection step (34) by detecting X-rays at respective angular positions of the detector to obtain one or more measurement peaks;
in an initial analysis step (32), analysing the result of the initial X-ray measurement, to obtain an analysis of the initial X-ray measurement; and
in the first configuration selection step (34), selecting the collimator configuration based on the analysis of the initial X-ray measurement.

11. The method of claim 10 wherein the at least one parameter is an intensity of one or more of the peaks, the threshold value is an intensity threshold value and the controller (17) is configured to control the first actuator arrangement (21) to:
move the first collimator (18) to its first configuration if the intensity of one or more of the peaks is above the intensity threshold value, or
move the first collimator (18) to its second configuration when the intensity of one or more of the peaks is below the intensity threshold value.

12. The method of claim 11 wherein the controller is configured to control the first actuator arrangement to move the second collimator to its first configuration when the intensity of one or more of the peaks is below the intensity threshold value.

13. The method of claim 10 further comprising comparing the Full Width at Half Maximum of one or more of the peaks to a width threshold value or comparing the peak asymmetry of one or more peaks to a peak asymmetry threshold value.

14. The method of claim 10 wherein the initial analysis step (32) further comprises determining an angular range based on the analysis of the initial X-ray measurement, and controlling the first actuator arrangement to move the first collimator (18) to its first configuration when the angular position of the X-ray detector (14) is within the angular range, and controlling the first actuator arrangement (21) to move the first collimator (18) to its second configuration when the angular position of the detector is outside of the angular range.

15. The method of claim 10, wherein in the initial analysis step (32), analysing the result of the initial X-ray measurement comprises comparing at least one parameter of the one or more measurement peaks to a threshold value.

* * * * *